United States Patent [19]

Iszczyszyn et al.

[11] Patent Number: 5,939,007

[45] Date of Patent: Aug. 17, 1999

[54] METHOD FOR MANUFACTURE OF A FIBER REINFORCED COMPOSITE SPAR FOR ROTARY WING AIRCRAFT

[75] Inventors: Nicholas Iszczyszyn, Stratford; Allen E. Trudeau, Milford; David A. Kovalsky, Huntington, all of Conn.

[73] Assignee: Sikorsky Aircraft Corporation, Stratford, Conn.

[21] Appl. No.: 08/996,759

[22] Filed: Dec. 23, 1997

Related U.S. Application Data

[63] Continuation-in-part of application No. 08/416,740, Aug. 31, 1994, Pat. No. 5,755,558.

[51] Int. Cl.$^6$ .......................... B29C 33/32; B29C 43/10; B29C 70/34

[52] U.S. Cl. .............. 264/258; 264/314; 425/3; 425/506; 156/156; 156/538

[58] Field of Search .................... 264/258, 294, 264/313, 314, 136, 137, DIG. 44, 405, 480; 425/3, 403, 403.1, DIG. 33, 506; 156/272.2, 538, 556, 156, 190, 191, 194; 29/889.71, 889.72

[56] References Cited

U.S. PATENT DOCUMENTS

| | | | |
|---|---|---|---|
| 3,782,856 | 1/1974 | Salkind et al. | 416/226 |
| 3,967,996 | 7/1976 | Kamov et al. | 156/156 |
| 4,397,048 | 8/1983 | Brown et al. | 3/2 |
| 4,621,980 | 11/1986 | Reavely et al. | 416/226 |
| 5,087,187 | 2/1992 | Simkulak et al. | 425/112 |
| 5,571,357 | 11/1996 | Darrieux et al. | 156/173 |

Primary Examiner—Jan H. Silbaugh
Assistant Examiner—Michael Poe
Attorney, Agent, or Firm—Brian A. Collins

[57] ABSTRACT

A method for manufacture of a fiber reinforced composite spar for a helicopter rotor blade including upper and lower sidewall regions and forward and aft conic regions. Constant width crossplies and unidirectional plies are stacked and arranged to form crossply and unidirectional laminates. The composite spar is manufactured via a vacuum forming technique which includes forming the composite laminates directly over an inflatable mandrel assembly. Regarding the latter method, a spar forming apparatus is used to position and manipulate the mandrel assembly as composite laminates are laid. The spar forming apparatus includes first and second pedestal supports being suitably configured so as to facilitate formation of the butt joints in the conic regions of the composite spar. The pedestal supports are movable from a first orientation to facilitate lay-up of composite laminates over the mandrel assembly, to a second orientation to facilitate transfer of the mandrel assembly from one to the other of the pedestal supports. The spar forming apparatus further includes an electromagnetic coil system comprising at least one electrically activated coil and a controllable power source. The electrically activated coils are disposed in combination with each of the pedestal supports and the controllable power source selectively energizes the electrically activated coils to effect a magnetic clamping force between the mandrel assembly and one of the pedestal supports. Such electromagnetic coil system accurately positions the inflatable mandrel assembly during lay-up of the composite laminates and effects transfer of the mandrel assembly.

1 Claim, 16 Drawing Sheets

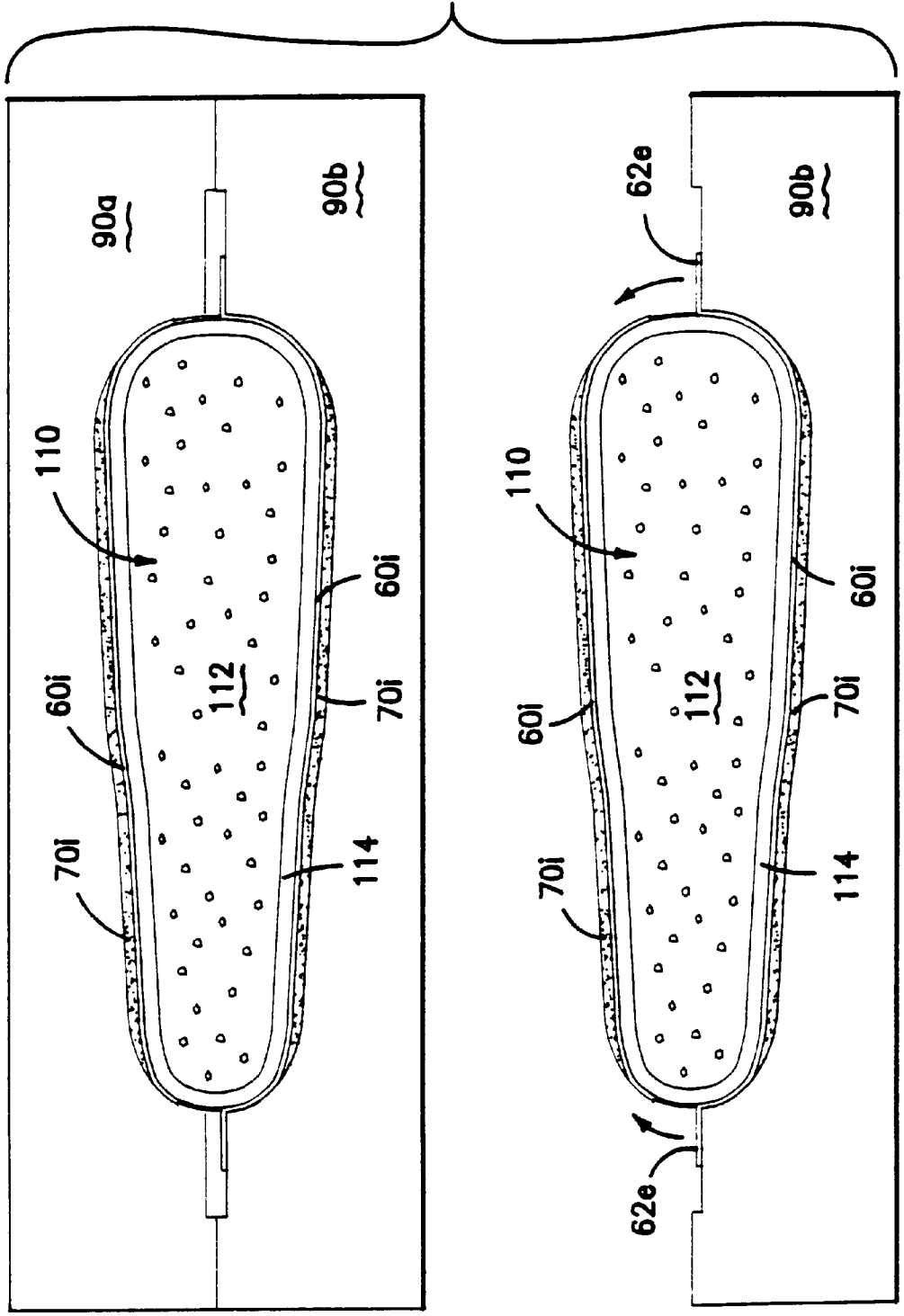

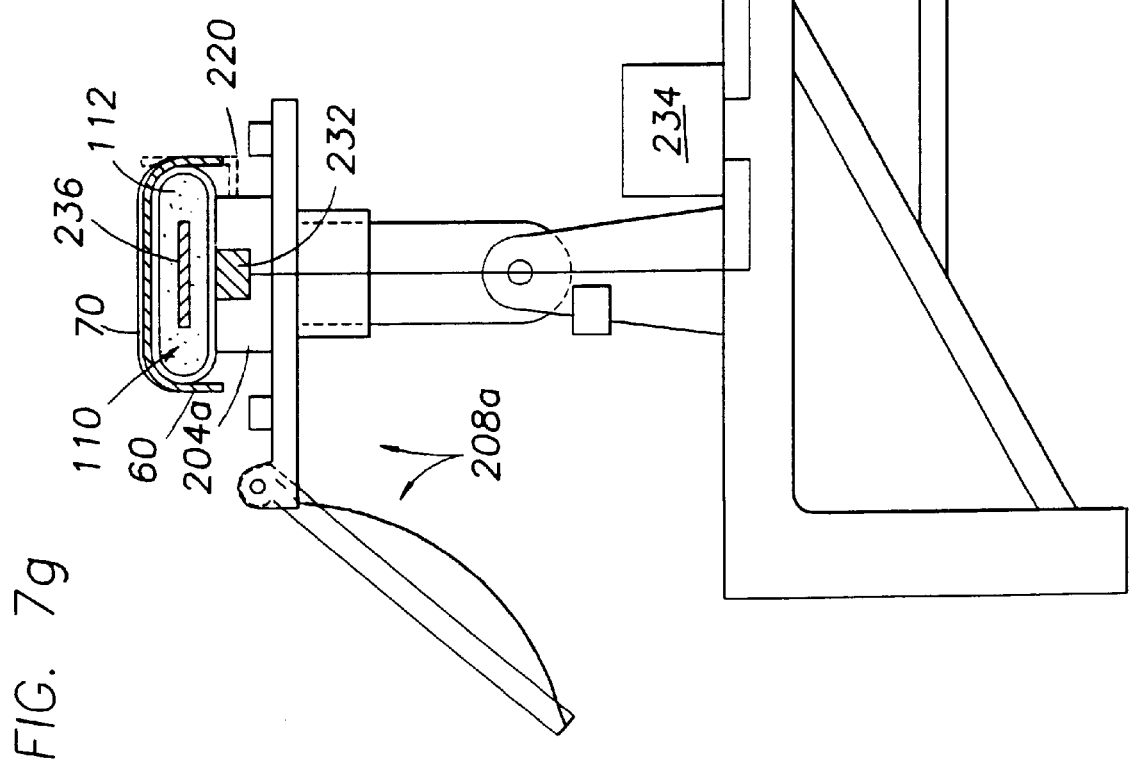

METHOD FOR MANUFACTURE OF A FIBER REINFORCED COMPOSITE SPAR FOR ROTARY WING AIRCRAFT

RELATED APPLICATION

The present application is a continuation-in-part of U.S. patent application Ser. No. 08/416,740, filed Aug. 31, 1994, now U.S. Pat. No. 5,755,558, entitled "Fiber Reinforced Composite Spar For A Rotary Wing Aircraft and Method of Manufacture thereof".

TECHNICAL FIELD

The present invention relates to fiber reinforced resin matrix composites, and more particularly, to an fiber reinforced composite spar for a rotary wing aircraft having enhanced structural properties, a method for facilitating the manufacture thereof and a spar forming apparatus useful in fabricating the composite spar.

BACKGROUND OF THE INVENTION

A rotor blade spar is the foremost structural element of a helicopter rotor blade assembly inasmuch as its primary function is to transfer combined flapwise, edgewise, torsional and centrifugal loads to/from a central torque drive hub member. Typically, a leading edge sheath and trailing edge pocket assembly mount to and envelop the spar thereby yielding the desired airfoil contour. The spar typically extends the full length of the rotor blade and mounts at its inboard end to a cuff assembly or fitting which facilitates mounting to the hub member. Due to the extreme operational loading environment of the rotor blade, high strength, high density materials such as aluminum or titanium have, in the past, been the materials of choice for spar construction.

More recently, however, fiber reinforced resin matrix composite materials, e.g., graphite and fiberglass, have been employed due to their advantageous strength to weight ratio, corrosion resistance, and improved damage tolerance. Regarding the latter, the structural fibers of composite materials can be viewed as a plurality of redundant load paths wherein damage to one or more fibers can be mitigated by the load carrying capability of adjacent fibers.

Despite the inherent weight and strength advantages of advanced composites, the widespread use thereof has been impeded by the high cost of associated fabrication methods. Blending the desired structural characteristics with a low cost manufacturing process, i.e., one which reduces labor intensive process steps yet maintains laminate quality, has been an ongoing and continuous challenge for designers of composite structures.

Primary structural items to be considered by the designer include: the selection of fiber reinforcement, i.e., materials having the requisite mechanical properties, resin binder, fiber matrix orientation, fiber continuity, alleviation of stress concentrations due to ply drop-offs or joint configurations, and reduction of thermally induced stresses. To maximize the benefits of composites it is essential that the fiber orientation be optimally tailored to meet the strength and stiffness requirements for a particular application. That is, composites can be tailored to be anisotropic (capable of carrying load in a particular direction) rather than quasisotropic (equal strength in all directions); hence, orienting the fibers in the direction of the load will optimally result in the most weight efficient structure. Similarly, by varying the use of available matrix reinforcement materials (e.g., graphite, fiberglass, aramid fibers), the designer is able to control such parameters as vibratory and steady bending strength, stiffness, and toughness. In addition to the selection of materials and/or optimum fiber orientation, the continuity or discontinuity of fibers, and methods of joining discontinuous plies will significantly impact component strength. Generally, it is desirable to maintain fiber continuity and stagger joints so as to prevent stress concentrations and/or the build-up thereof in a particular region. Still other considerations relate to the thermal induced stresses which may result in microcracking. Microcracking is a phenomena wherein thermally induced stresses cause small cracks to develop in the binder material due to the thermal incompatibility of adjacent composite material. Generally, it is preferable to use the same material throughout the laminate or materials of similar thermal coefficient to reduce this effect.

These considerations are weighed and balanced against the cost and complexity of a particular fabrication technique. Typically, the manufacturing approach should: minimize cutting operations and material scrap, facilitate ease of handling, facilitate automation to a maximum practical extent, minimize the probability of operator/laminator error, be repeatable, maintain uniform fiber volume, provide uniform laminate quality (via uniform compaction), and yield a mass-balanced lay-up, i.e., properly distribute the weight of the composite article.

Conventional methods for manufacturing composite spars include filament winding and prepreg lay-up of composite material. The filament winding process involves the winding of high strength filaments disposed in a matrix of binder material about a mandrel assembly of a shape generally corresponding to the required shape of the finished article. The mandrel assembly typically comprises a rigid substructure to support the wound matrix and an impervious bladder or bag disposed over the rigid substructure. In the case of the manufacture of an elongated article, such as a rotor blade spar, the filaments are wound over the mandrel, and the mandrel and filaments are reciprocally displaced relative to one another along the longitudinal or winding axis of the mandrel to build a plurality of layers of filamentary material. Upon completion of the filament winding process, the mandrel/wound lay-up is placed in a matched metal mold and cured. During the curing process the bladder is pressurized to urge the fibers against the mold surfaces of the matched metal mold.

Advantages of filament winding include continuity of fibers (i.e., the process requires no cutting or ply overlaps), ease of handling, and repeatability. A primary disadvantage to filament winding, however, relates to difficulties associated with expanding/urging the fibers against the mold surfaces of a matched metal mold. Since the fibers are initially wound about the mandrel under tension, it is difficult to force the elongation and/or shifting of fibers during bag pressurization, to achieve proper laminate compaction. Should the fibers resist complete and uniform compaction, the composite article may become resin-rich or resin-starved in particular areas resulting in poor laminate quality. In the case of an elliptically shaped composite article, the conic regions, i.e., corresponding to the leading and trailing edges of the rotor blade, will be most vulnerable to unacceptable variations in fiber volume. Another disadvantage to filament winding relates to the difficulty associated with establishing fiber orientations at or near 0° relative to the longitudinal or winding axis of the mandrel assembly. Insofar as filament winding apparatus are deficient in this regard, it is common practice to periodically interrupt the winding operation to interleave unidirectional, i.e., 0°, fibers.

Reavely et al., U.S. Pat. No. 4,621,980, describes an improved structural rotor blade spar manufactured via a filament winding process. Reavely teaches a multi-layered filament wound composite spar incorporating graphite fiber layers having a fiber orientation below about ±35° relative to the longitudinal axis and polyaramide fibers oriented below about ±15°. Such orientations produce an acceptable combination of axial and torsional stiffness while enabling the use of a filament winding process. That is, low orientation angles are used to achieve the desired axial stiffness inasmuch as filament winding is not amenable to laying fibers at or near 0° relative to the longitudinal axis. The process, therefore, provides a lay-up which compromises the desired fiber orientation, i.e., at or near 0°, to enable the implementation of a filament winding or automated manufacturing process.

The prepreg lay-up technique employs the use of discrete plies or laminates of pre-impregnated composite fabric, which are hand-stacked and interleaved over an inflatable mandrel assembly. The mandrel assembly is placed in a matched metal mold and cured in an autoclave oven for application of heat and pressure. When molding an elliptically shaped article, the lay-up will typically incorporate "slip-planes" located at the interface between overlapping composite plies. These regions of overlap permit the composite lay-up to expand (via slippage across the interface) when curing the composite article. Advantages to the use of a pre-impregnated composite material include ease of compaction, uniform laminate quality, minimal investment for capital equipment, and the ability to selectively orient and build-up material in particular regions. Disadvantages include high labor costs due to the laborious hand lay-up process, comparatively higher probability of operator error (e.g., an operator may inadvertently omit a ply in a multi-ply laminate), and discontinuity of fibers within the laminate.

Salkind et al. U.S. Pat. No. 3,782,856 teaches a twin beam composite spar having a plurality of high tensile strength fibers in a suitable binding matrix. The fibers include off-axis and unidirectionally oriented fibers which are combined to provide high torsional and axial stiffness. High modulus graphite fibers oriented at ±45° relative to the longitudinal axis are employed for maximum torsional stiffness. Low modulus fiberglass fibers oriented at 0°, i.e., along the longitudinal axis, are incorporated for maximum axial stiffness. Insofar as Salkind intersperses these laminates, and/or bonds packs of off-axis fibers to packs of unidirectional fibers, microcracking will result which adversely affects laminate strength. Furthermore such interspersion of alternating layers of material (one graphite, one fiberglass etc.) is highly labor intensive and prone to operator error.

U.K. Patent Application 2,040,790 discloses a method for manufacturing a constant width composite spar including the steps of: wrapping layers of pre-cut composite fabric about an inflatable mandrel assembly, and forming overlap joints in the upper and lower sidewall regions of the composite spar, i.e., corresponding to the upper and lower airfoil surfaces of the rotor blade. The overlap joints provide slip plane surfaces to facilitate compaction of the composite material during curing operations. Disadvantages to forming overlap joints in the upper and lower sidewalls relates to trapping or pinching the composite fabric upon inflation of the mandrel. Should the inflatable mandrel trap the composite fabric, the slip planes are unable to perform their desired function thereby resulting in poor laminate compaction. This location is also undesirable since the upper and lower sidewall regions are exposed to high flapwise bending stress which results in the superimposition of stresses induced by the joint interface (i.e., stress concentrations).

Kamov, U.S. Pat. No. 3,967,996, and U.K. Patent Applications GB 2040790A and GB 2148 821 are other examples of pre-preg lay-up processes for manufacturing composite spars.

A need, therefore, exists to provide a composite spar structure which optimally blends the desired structural characteristics with a fabrication process which facilitates low cost manufacture. More specifically, a need exists to produce a structurally efficient composite spar which obviates the effects of microcracking, minimizes thermal strain, minimizes weight, and provides damage tolerance. Furthermore, there exists a need to provide a manufacturing process which permits uniform composite material compaction, ease of material handling, reduced hands-on labor during assembly, and produces a composite spar having improved mass distribution properties.

DISCLOSURE OF INVENTION

It is one object of the present invention to produce a composite spar structure having optimal fiber orientation for enhanced torsional and axial strength with the attendant benefits of reduced weight.

It is another object of the invention to produce a composite rotor blade spar which obviates the adverse effects of microcracking.

It is yet another object of the invention to produce a composite spar having improved thermal strain properties.

It is still another object of the invention to produce a composite rotor blade spar having enhanced damage tolerance characteristics.

It is yet a further object of the invention to employ a pre-preg manufacturing process which permits uniform laminate compaction and provides improved laminate quality.

It is still another object of the invention to reduce the amount of fiber cutting required to reduce the per part fabrication costs.

It is still another object of the present invention is to provide an improved composite spar manufactured by a simplified manufacturing process which incorporates constant width prepreg material to facilitate automated and/or manual lay-up thereof.

It is still a further object of the present invention to provide an improved composite spar employing a fabrication process which provides improved mass distribution along the longitudinal length thereof.

It is yet another object of the present invention to provide an improved composite spar manufactured by a process which facilitates automation for reducing fabrication costs and improving part-to-part repeatability.

According to the invention a composite spar is segregated into regions and subregions wherein fiber reinforced resin matrix composite laminates are selectively arranged and the material properties thereof selectively chosen. The composite spar includes crossply laminates in each of the upper and lower sidewall regions having end portions extending into the forward and aft conic regions, respectively, to form structural joints therein. The crossply laminates include high modulus composite fibers in a binding matrix, which crossply fibers are oriented within a range of about ±38° to about ±42° relative to the longitudinal axis. The spar also includes at least one unidirectional laminate in each of the upper and lower sidewall regions interposed between the crossply laminates. Each unidirectional laminate includes a combination of high and low modulus composite fibers in a binding matrix, which unidirectional fibers are oriented substantially parallel to the longitudinal axis. The structural joints are located in a region of low bending stress relative to the flapwise bending axis and the unidirectional laminates are located in a region of high bending stress relative to the flapwise bending axis for providing maximum bending strength. The crossply laminates provide combined torsional and axial strength relative to the flapwise bending and longitudinal axes, and the fiber orientation thereof provides thermal compatibility with adjacent unidirectional laminates. The low modulus composite fibers of the unidirectional laminates also provide enhanced damage tolerance.

A method of fabricating the composite spar is also disclosed which includes forming a plurality of molds, each of the molds including complementary mold halves having mold surfaces defining the upper sidewall and lower sidewall regions and the forward and aft conic regions. The mold surfaces are of progressively larger dimension from an innermost to an outermost mold, which outermost mold defines the outer mold line contour of the composite spar. Next, crossply and unidirectional laminates are laid in the molds such that the crossply laminates are laid in the upper and lower sidewall regions and have end portions extending into the forward and aft conic regions. The end portions, furthermore, extend beyond one of the mold surfaces associated with one of the complementary mold halves in each mold to facilitate the formation of structural joints and slip planes in the forward and aft conic regions. The unidirectional laminates are laid in the upper and lower sidewall regions of the complementary molds. The laminates are then assembled over an inflatable mandrel assembly to form a preform assembly having the unidirectional laminates interposed between the crossply laminates. The assembly steps include: sequentially placing the inflatable mandrel assembly into the complementary mold halves of the molds, and joining the end portions of the crossply laminates to form structural joints and slip planes in the forward and aft conic regions. The outermost mold is then closed over the preform assembly and the inflatable internal mandrel is pressurized for urging and compacting the laminates against the mold surfaces of the outermost mold. The outermost mold is then placed in an autoclave oven for curing the laminates under heat and pressure. The method forms structural joints and slip planes in the conics regions to facilitate uniform compaction of the ply laminates.

Yet another method of fabrication is disclosed wherein the inflatable mandrel assembly is used for lay-up of the crossply and unidirectional laminates. As such, the necessity for a plurality of preliminary molds for aiding the lay-up process is eliminated. Furthermore, use of the mandrel assembly in combination with a spar forming apparatus facilitates the automated lay-up of the composite laminates over the conic regions of the mandrel assembly and the formation of butt joints therein.

The spar forming apparatus is operative to manipulate and accurately position an inflatable mandrel assembly during the manufacture of a composite spar. In this embodiment of the invention, the inflatable mandrel assembly includes ferrous material so as to act as one of the poles in an electromagnetic circuit. More specifically, the spar forming apparatus includes first and second pedestal supports each being suitably configured for supporting the inflatable mandrel assembly and having a width dimension which is less than the width dimension of the mandrel assembly. The pedestal supports are movable from a first position/orientation to facilitate lay-up of composite laminates over the mandrel assembly, to a second position/orientation to facilitate transfer of the mandrel assembly from one to the other of the pedestal supports. The spar forming apparatus further includes an electromagnetic coil system comprising at least one electrically activated coil and a controllable power source. The electrically activated coils are disposed in combination with each of the pedestal supports and the controllable power source selectively energizes the electrically activated coils to effect a magnetic clamping force between the mandrel assembly and one of the pedestal supports. Such electromagnetic coil system accurately positions the inflatable mandrel assembly during lay-up of the composite laminates and effects transfer of the mandrel assembly from one to the other of the pedestal supports.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 7a through 7e show the fabrication of the composite spar using molds for lay-up of the crossply and unidirectional laminates;

FIGS. 7f through 7j show an alternate embodiment of the fabrication technique wherein an inflatable mandrel assembly in combination with a spar forming apparatus is employed for lay-up of the crossply and unidirectional laminates;

BEST MODE FOR CARRYING OUT THE INVENTION

Figure 1:
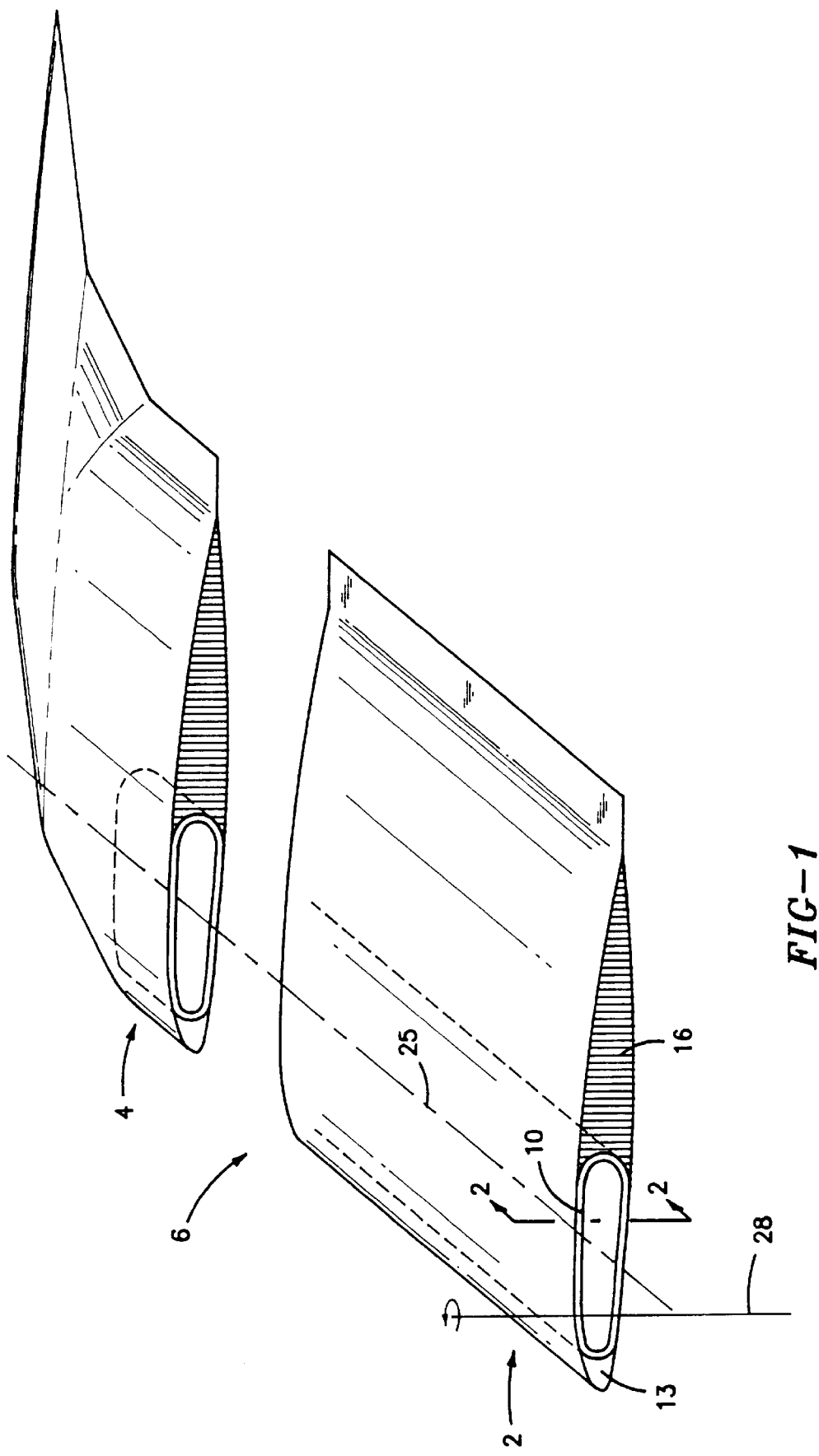
FIG. 1 is a partial perspective view of inboard and outboard segments of a composite rotor blade assembly including the composite spar of the present invention.

Referring now to the drawings wherein like reference characters identify corresponding or similar elements throughout the several views, FIG. 1 shows a partial perspective view of the root and tip end portions 2 and 4, respectively, of a helicopter rotor blade assembly 6 having an elliptically shaped composite spar 10 disposed between a leading edge sheath assembly 13 and trailing edge pocket assembly 16. The composite spar 10 extends from the root end portion 2 to the tip end portion 4 along a longitudinal axis 25, and transfers all rotor blade loads to/from a central torque drive hub member (not shown). Also shown is the rotor shaft axis 28 about which the rotor blade assembly 6 is driven.

Figure 2:
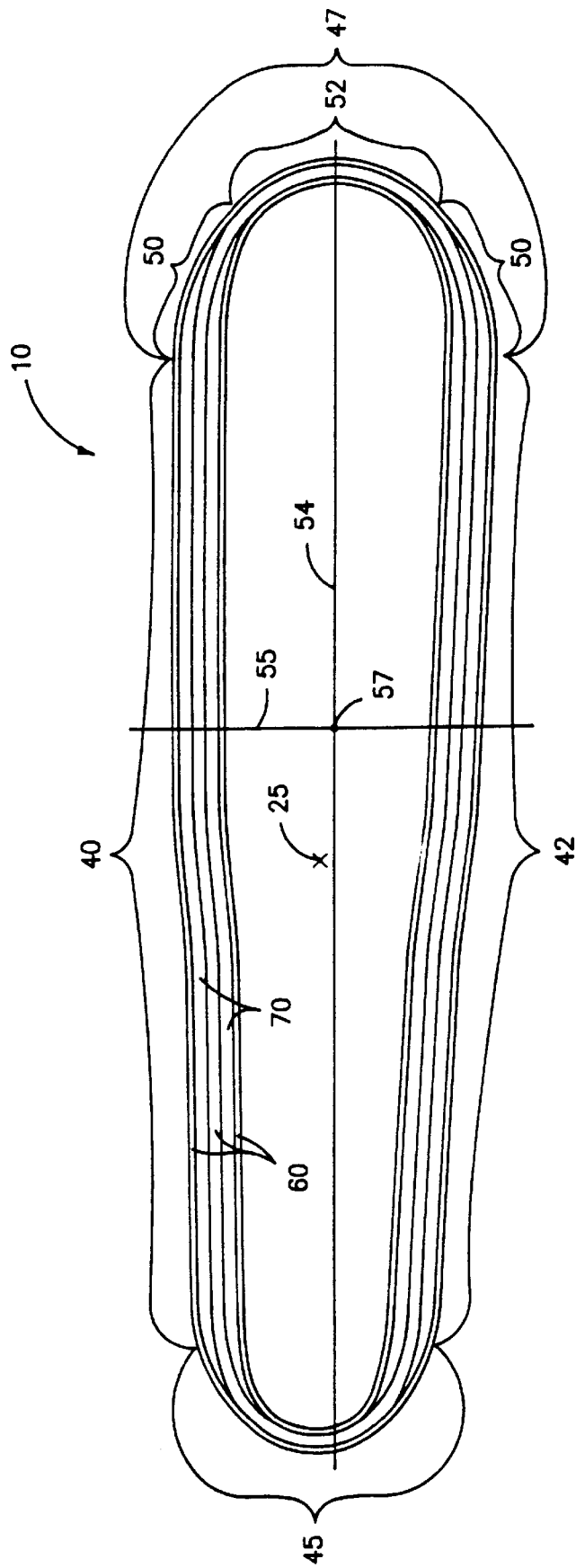
FIG. 2 is a cross-sectional view of the composite spar taken along line 2—2 of FIG. 1.

For the purposes of discussion the composite spar 10 is segregated into regions and subregions wherein the composite material used in the construction is selectively arranged and material properties selectively chosen to achieve the foregoing objectives. FIG. 2 depicts an inboard, or root end, cross-section along line 2—2 of FIG. 1. Wherein the composite spar 10 is shown to include upper and lower sidewall regions 40 and 42, respectively, corresponding to upper and lower airfoil surfaces of the rotor blade assembly 6, and forward and aft conic regions 45 and 47, respectively, corresponding to the rotor blade leading and trailing edges. The conic regions 45, 47 also define transition and closure subregions 50 and 52, respectively, wherein the properties of the composite material are altered, e.g., thickness, material composition etc., from those in the sidewall regions 40, 42. The forward and aft conic regions 45, 47 connect the upper and lower sidewall regions 40, 42 thus forming a box structure for reacting vertical shear loads. Also shown are the flapwise and edgewise neutral bending axes 54 and 55 respectively, associated with the rotor blade assembly 6. The flapwise bending axis 54 extends chordwise along the composite spar 10 and the edgewise bending axis 55 is vertically oriented, which flapwise and chordwise bending axes 54, 55 intersect the centroid 57 of the rotor blade assembly 6. The flapwise and edgewise bending axes 54, 55 each represent the locus of points wherein bending stresses reverse orientation (e.g., from compressive to tensile stress and vice versa) and are consequently neutralized or nulled. While the axes 54, 55 represent lines of zero bending stress, points displaced therefrom are exposed to increasingly larger compressive or tensile bending stresses.

As will be apparent in the detailed discussion which follows, the orientation, location and material selection is critical to providing structural and weight efficiency while furthermore facilitating ease of manufacture. In the preferred embodiment of the invention, the composite spar 10 is comprised of a plurality of individual crossplies, unidirectional plies and plies of reinforcing fabric which are selectively arranged in the aforementioned regions and subregions. The crossplies are combined to form crossply laminates 60, and the unidirectional plies are combined to form unidirectional laminates 70. The crossply laminates 60 are located in the upper and lower sidewall regions 40, 42 and extend into the forward and aft conic regions 45, 47. The unidirectional laminates 70 are located in the upper and lower sidewall regions 40, 42 and transition subregions 50 of the forward and aft conic regions 45, 47.

Figure 3:
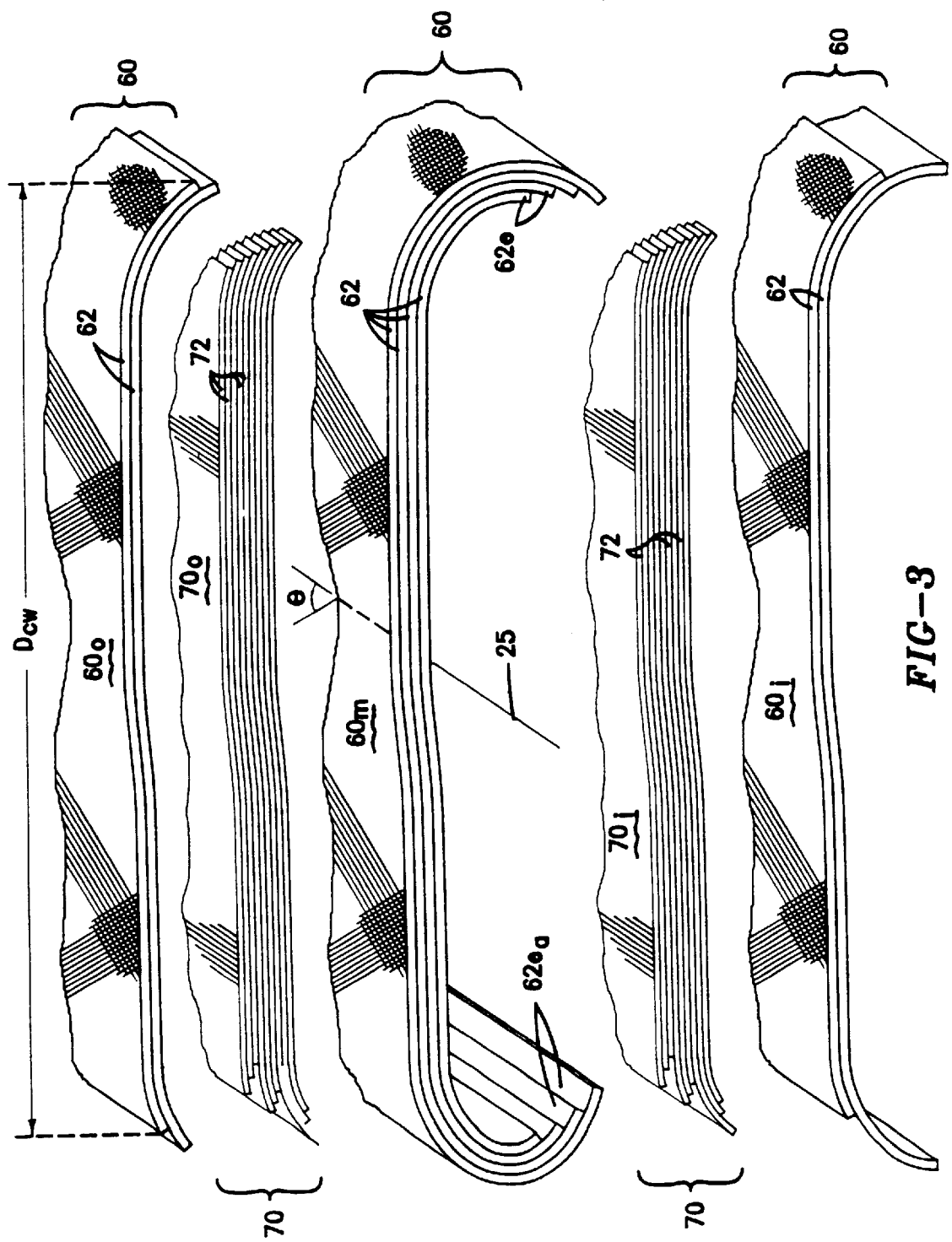
FIG. 3 is an exploded view of the composite lay-up used in construction of the composite spar of FIG. 2 showing the fiber orientation and arrangement of various crossply and unidirectional laminates employed therein.

FIG. 3 is an exploded view of the upper half of the composite plies employed in the construction of the composite spar 10, and shows with greater clarity, the size, fiber orientation, and arrangement of the plies. The lower half is omitted inasmuch as the ply construction is essentially identical to that of the upper half. While the reference numerals associated with the composite plies of the upper half are the same as the those in the lower half, occasionally the plies in the upper and lower half are designated with a subscript, "a" and "b", respectively, to impart a more complete understanding of the invention.

A plurality of resin impregnated fiber reinforced crossplies are arranged in paired relation to form individual crossply pairs 62. That is, one crossply having fibers oriented in a +θ direction is paired with another having fibers oriented in a −θ direction relative to the longitudinal axis 25. The coupling or pairing of crossplies aids in material handling, i.e., without separation or unraveling of fibers. For ease of understanding, crossply pairs will, hereinafter, be referred to as "a crossply" or "the crossplies", insofar as such materials are typically purchased from suppliers as integrated sheets of paired material. The crossplies 62 are composed of high modulus fibers such as graphite fibers in a binding matrix. These fibers generally have a tensile strength of about $3.45 \times 10^9$ N/m$^2$ (500,000 psi) to about $4.83 \times 10^9$ N/m$^2$ (700,000 psi), and a modulus of about $2.0676 \times 10^{11}$ N/m$^2$ (30×10$^6$ psi) to about $3.446 \times 10^{11}$ N/m$^2$ (50×10$^6$ psi), and preferably about $2.7568 \times 10^{11}$ N/m$^2$ (40× 10$^6$ psi). These fibers may range in cross-section from about 6.35 $\mu$m (0.00025 inch) to about 7.62 $\mu$m (0.00030 inch). The crossply fibers have a predetermined fiber orientation angle θ, which are preferably oriented within a range of about ±38° to about ±42°, and most preferably about ±40° relative to the longitudinal axis 25 of the composite spar 10.

The crossplies 62 have a chordwise width dimension Dcw, which varies from ply to ply, thereby resulting in end portions $62e_a$ which extend beyond, or, alternatively, terminate before an adjacent crossply. Each crossply 62, however, is constant in chordwise width dimension along the longitudinal axis 25 of the composite spar 10, i.e., from the rotor blade root end 2 to the tip end 4.

The crossplies 62 are stacked and arranged i.e., laid up, to form the crossply laminates 60. As used herein, the term "laid" or "lay-up" means the buildup of plies to form a laminate, the placement of such plies over a mold surface, or the placement of the entire laminate over the mold surface to assemble/build the composite spar—prior to curing. In the preferred embodiment, three crossply laminates are shown, i.e., innermost, outermost and intermediate crossply laminates 60$i$, 60$o$ and 60$m$, respectively, however, it will become apparent that fewer or more crossply laminates can be employed while remaining within the spirit and scope of the invention.

A plurality of resin impregnated unidirectional plies 72 are stacked and arranged to form at least one unidirectional laminate 70 in each of the upper and lower sidewall regions 40, 42. Preferably, the plies 72 form two unidirectional laminates, i.e., an innermost and outermost unidirectional laminate 70$i$ and 70$o$, respectively, interposed between the crossply laminates 60$i$, 60$o$, and 60$m$. The unidirectional plies 72 are composed of high and low modulus fibers such as graphite and fiberglass, respectively, in a binding matrix. The fiberglass fibers generally have a tensile strength of about $4.55 \times 10^{11}$ N/m$^2$ (660,000 psi), a modulus of about $6.892 \times 10^{10}$ N/m$^2$ (10×10$^6$ psi) to about $9.48 \times 10^{10}$ N/m$^2$ (14×10$^6$ psi), and preferably about $8.683 \times 10^{10}$ N/m$^2$ (12.6× 10$^6$ psi), and a cross section of about 8.89 $\mu$m (0.00035 inches). The graphite fibers are of the same strength, modulus and thickness as those employed in the above-described crossplies 62. The high and low modulus fibers are oriented substantially parallel, i.e., less than 5°, and preferably 0°, relative to the longitudinal axis 25 of the composite spar 10.

Figure 4:
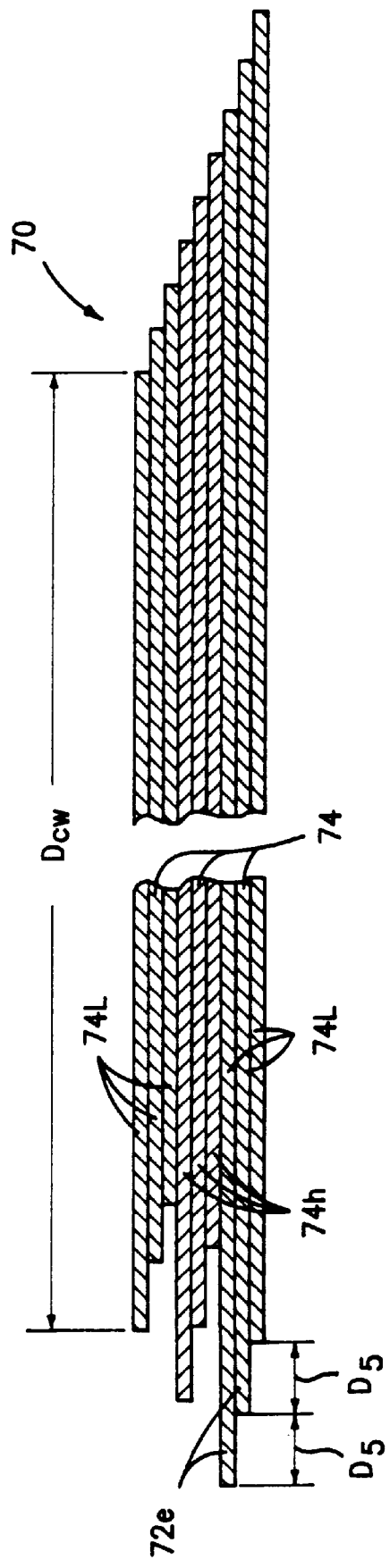
FIG. 4 shows an enlarged portion of the unidirectional laminate of FIG. 3 which more clearly shows the alternating layers of high and low modulus fibers.

Referring to FIG. 4, the unidirectional plies 72 of the unidirectional laminates 70$i$, 70$o$ are combined or grouped to form alternating layers 74 of high and low modulus fiber reinforcement. Preferably, layers 74H having high modulus fiber reinforcement are disposed between layers 74L having low modulus fiber reinforcement. More preferably, the low modulus layers 74L are positioned adjacent the crossply laminates (not shown in FIG. 4) which, as will be discussed in greater detail below, serves to produce a strain balanced laminate.

The unidirectional plies 72 are essentially of constant chordwise width dimension from ply to ply within each layer 74, but are staggered, e.g., from right to left or visa versa, for displacing the end portions 72e thereof a distance Ds. Staggering the end portions 72e facilitates thickness transitions which occur within the finished composite spar 10. Such transitions are further accommodated by increasing the width dimension of the unidirectional plies 72 from layer to layer 74 within each unidirectional laminate 70. Similar to the crossplies 62, each unidirectional ply 72 is constant in chordwise width dimension Dcw along the longitudinal axis 25 of the composite spar 10.

The resin matrix material which is useful in producing these structures is epoxy resin, such as "8552" which is commercially available from Hexcel Corporation. However, any number of epoxy resin systems may be used, such as "5225" which is commercially available from BASF.

Figure 5:
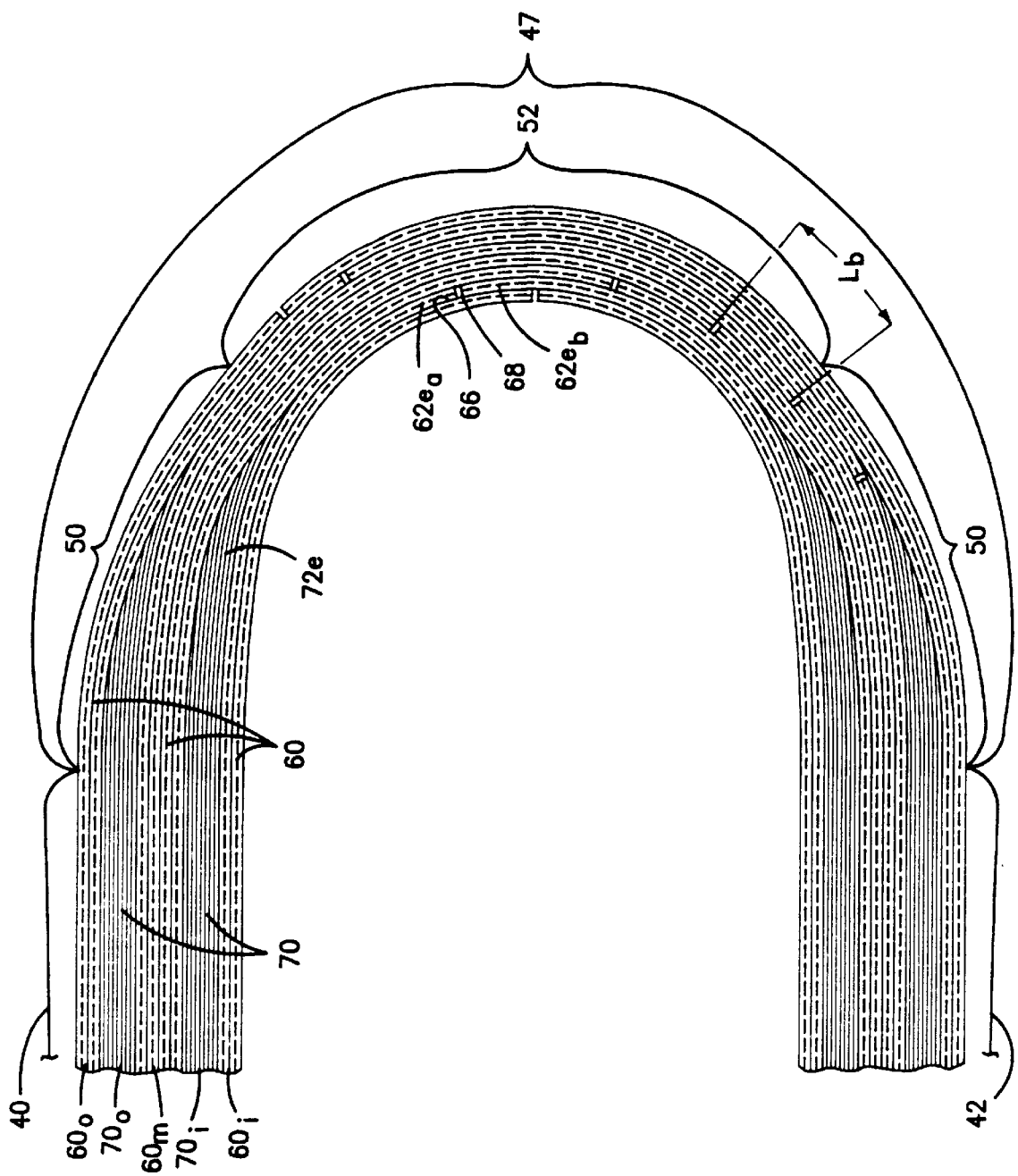
FIG. 5 is an enlarged cross-sectional view of the composite spar which shows the crossply and unidirectional laminates in various regions and subregions of the composite spar.

FIG. 5 shows an enlarged cross-sectional view of the right-hand (aft) portion of the composite spar wherein the location and arrangement of the crossply laminates 60 and unidirectional laminates 70 are more clearly illustrated. The unidirectional laminates 70 are located in each of the upper and lower sidewall regions 40, 42 of the composite spar 10 and are interposed between crossply laminates 60. In the preferred embodiment, the unidirectional laminates 70 extend into the transition subregions 50 of the forward and aft conics regions 45, 47. The crossply laminates 60 are, therefore, spaced-apart in each of the upper and lower sidewall regions 40, 42, and gradually converge in the transition subregions 50. Full convergence of the crossply laminates 60 occurs in the closure subregion 52, wherein the end portions $62e_a$, $62e_b$ form a constant thickness of crossplies therein. It will be apparent, therefore, that the laminate thickness in the sidewall regions 40, 42 is greater than the laminate thickness in the closure subregions 52.

More specifically, and in accordance with the preferred description, the unidirectional laminates 70i, 70o, are interposed between the crossply laminates 60 thereby forming innermost, outermost and intermediate crossply laminates 60i, 60o, 60m, in each of the upper and lower sidewall regions 40, 42 and transition subregions 50. Furthermore, the staggered end portions 72e of the unidirectional laminates extend into and gradually drop-off in the transition subregions 50 of the conic regions 45, 47.

As alluded to earlier, the crossply laminates 60 have end portions $62e_a$, $62e_b$ which extend into the forward and aft conic regions 45, 47. The end portions $62e_a$ of the crossply laminates 60 forming the upper sidewall region 40 overlap with the end portions $62e_b$ of the crossply laminates 60 forming the lower sidewall region 42 to form slip plane interfaces 66 between adjacent crossplies in the forward and aft conic regions 45, 47. Furthermore, the end portions $62e_a$ $62e_b$ form structural joints 68 in the conic regions 45, 47. The structural joints 68 are, preferably, butt joints which are staggered in the conic regions 45, 47 for preventing stress concentrations from mounting in a particular area. The peripheral length, Lb, between the butt joints 68 is between about 0.448 cm (0.175 inches) to about 0.832 cm (0.325 inches), and preferably about 0.64 cm (0.25 inches).

Figure 6:
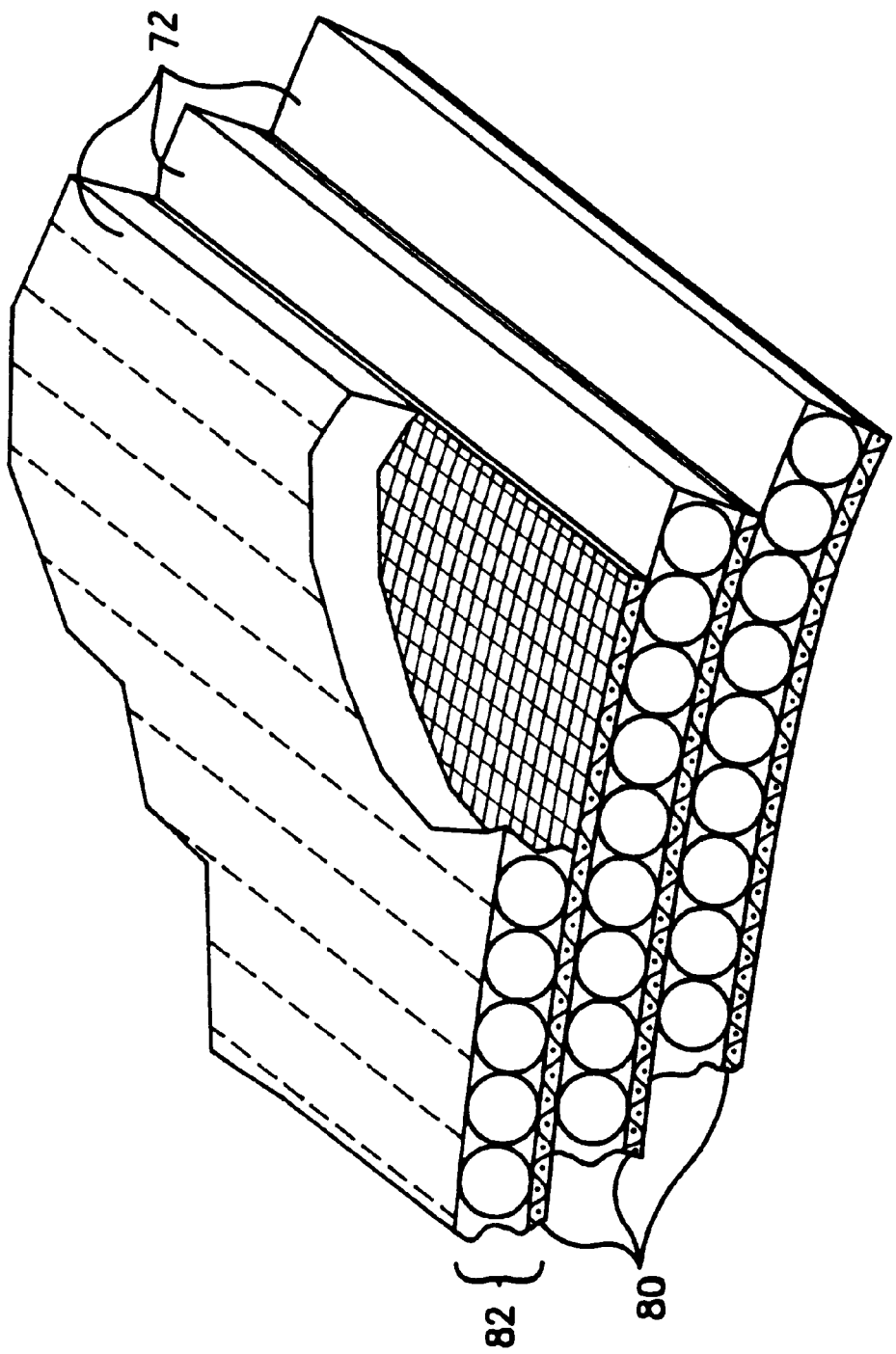
FIG. 6 is an exploded view of the composite lay-up of FIG. 3 showing plies of reinforcing fabric within the unidirectional laminate.

Referring to FIG. 6, the unidirectional plies 72 of the unidirectional laminate are shown to include plies of reinforcing fabric 80 disposed between the unidirectional plies 72. The reinforcing fabric 80 is comprised of low modulus fiberglass material and includes fibers oriented above about ±80°, and preferably about 90°, relative to the longitudinal axis 25 of the composite spar 10. The fabric may either be unimpregnated, without binding matrix, or coupled with the unidirectional plies 72 as an impregnated pair 82. When used in an unimpregnated state, the flow of resin from adjacent plies will saturate the fabric during the curing process. The reinforcing fibers generally have a tensile strength of about $4.55 \times 10^{11}$ N/m$^2$ (660,000 psi), a modulus of about $6.892 \times 10^{10}$ N/m$^2$ ($10 \times 10^6$ psi) to about $9.48 \times 10^{10}$ N/m$^2$ ($14 \times 10^6$ psi), and preferably about $8.683 \times 10^{10}$ N/m$^2$ ($12.6 \times 10^6$ psi), and a cross section of about 8.89 $\mu$m (0.00035 inches).

Figure 7A:
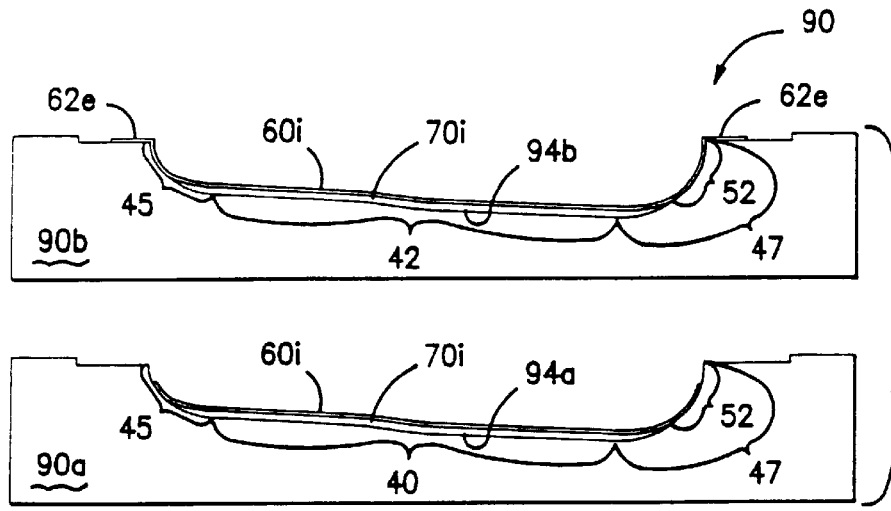

The composite spar 10 of the present invention may be fabricated as illustrated in FIGS. 7a–7e. In one embodiment of the fabrication method, innermost, outermost and intermediate molds 90, 95, 100 are used to lay-up and form the composite spar 10. The molds have progressively larger dimensions, i.e., outer mold line (OML), from the innermost to the outermost molds 90–100 to accommodate the progressive build-up of composite material. Referring to FIG. 7a, the innermost mold 90 includes complementary mold halves 90a and 90b which are used to lay-up the innermost unidirectional laminates 70i and crossply laminates 60i. The mold halves 90a, 90b include mold surfaces 94a and 94b which define the upper and lower sidewall regions 40, 42 and forward and aft conic regions 45, 47. For ease of understanding, reference numerals corresponding to the regions and subregions of the composite spar 10 will also refer to the corresponding mold surfaces 94a, 94b of the complementary mold halves 90a, 90b.

In accordance with the preferred embodiment of the invention, the innermost unidirectional laminates 70i are first laid into the complementary mold halves 90a, 90b of the innermost mold 90. The unidirectional plies 72 which form each layer 74 of high and low modulus fiber reinforcement are staggered from ply to ply to facilitate thickness transitions occurring in the transition subregions 50. The width of the unidirectional plies 72 is selected such that the plies do not extend into the closure subregion 52 of the mold surfaces 94a, 94b. When incorporating plies of reinforcing fabric 80 into the lay-up, the unidirectional laminates 70 will include a plurality of impregnated ply pairs 82 (see FIG. 6), i.e., the unidirectional plies 72 and reinforcing fabric 80.

The innermost crossply laminates 60i, are then laid over the innermost unidirectional laminates 70i so that the end portions 62e of the crossply laminates 60i, extend into the forward and aft conic regions 45, 47 of the mold surfaces 94a, 94b. The end portions 62e of the crossply laminates 60i associated with one of the complementary mold halves 90a, 90b extend beyond the mold surfaces 94a, 94b to facilitate the formation of structural joints 68 and associated slip planes 66 in the forward and aft conic regions 45, 47. As mentioned earlier, the individual crossplies 62 are of select chordwise width dimension to stagger the end portions 62e thereof, thereby distributing the location of each structural joint 68. The crossply and unidirectional laminates 60i, 70i are of constant chordwise width along the longitudinal axis 25 of the spar 10 and require no cutting or darting of material.

Figure 7B:
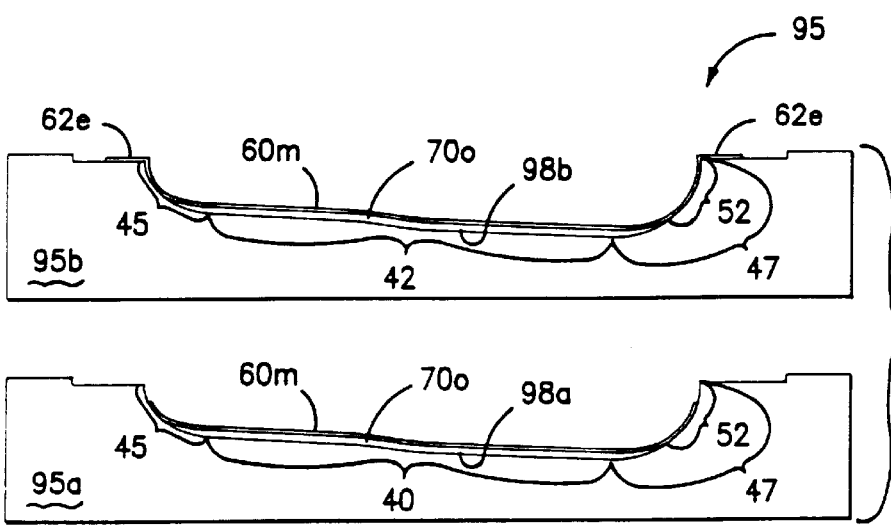

Referring to FIG. 7b, the intermediate crossply laminates 60m, and outermost unidirectional laminates 70o are laid into the complementary mold halves 95a, 95b of the intermediate mold 95 using the same lay-up procedure as that described above for the innermost mold 90. As mentioned earlier the mold surfaces 98a, 98b are slightly larger in OML dimension than that of the mold surfaces 94a, 94b to accommodate the build-up of composite material.

Figure 7C:
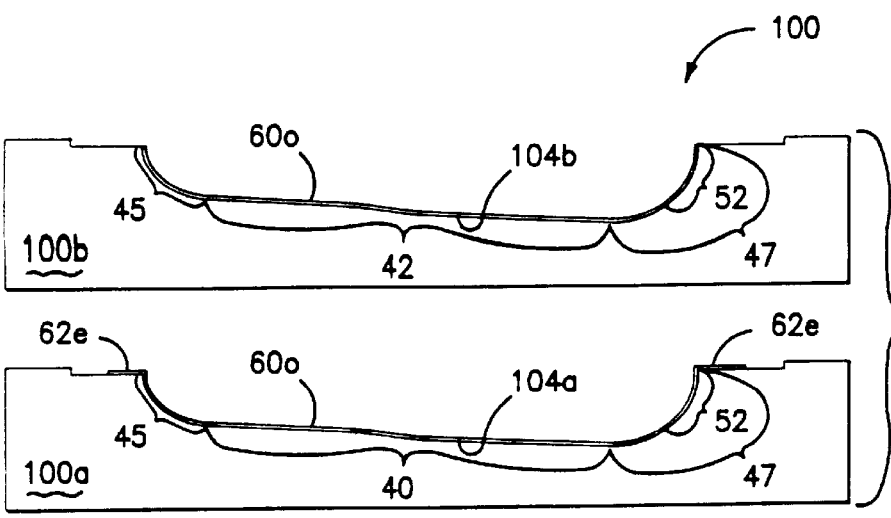

Referring to FIG. 7c, the outermost mold 100 having complementary mold halves 100a and 100b is used to lay-up the outermost crossply laminates 60o. The outermost mold 100 includes mold surfaces 104a and 104b which correspond to and define the outer mold line (OML) contour of the upper and lower sidewall and forward and aft conic regions 40, 42, 45, 47. The outermost crossply laminates 60o are laid into the complementary mold halves 100a, 100b of the outermost mold 100 so that the end portions 62e extend into the forward and aft conic regions 45, 47 of the mold surfaces 104a, 104b. Similar to the above described lay-up procedure for the innermost and intermediate molds 90, 95, the end portions 62e of the crossply laminates 60o, associated with one of the complementary mold halves 100a, 100b extend beyond the mold surfaces 104a, 104b to facilitate the formation of the structural joints 68 and associated slip planes 66 in the forward and aft conic regions 45, 47. Again, the end portions 62e are staggered to facilitate the formation of and distribute the structural joints 68 in the conic regions 45, 47. The crossply laminates 60o, are of constant chordwise width along the longitudinal axis 25 of the spar 10.

The crossply and unidirectional laminates 60, 70 which have been laid in the complementary mold halves of the innermost, intermediate and outermost mold 90, 95, 100 are then debulked using known debulking techniques. For example, an impervious nylon or silicon "vacuum bag" is placed over a complementary mold half, and the edges of the bag are taped or otherwise adhered thereto. A vacuum port is attached to the bag, and a vacuum is drawn in the cavity occupied by the laminates. When a vacuum is drawn, atmospheric pressure urges the bag against the laminates which partially consolidates the plies thereof.

Next, as shown in FIG. 7d an inflatable internal mandrel assembly 110, the shape of which corresponds to the internal shape of the composite spar 10, is placed into the one of the complementary mold halves 90b of the innermost mold 90. The mandrel assembly 110 includes a rigid substructure 112 enveloped by an impervious bladder 114 which is pressurized during curing operations. While the substructure 112 may be composed of any rigid material, it is preferably composed of a polystyrene foam which reduces in size in response to elevated temperatures. The other complementary mold half 90a of the same mold is placed over the internal mandrel assembly 110 for locating and placing the remaining innermost crossply and unidirectional laminates 60i, 70i over the mandrel assembly 110. To aid in material handling a release material or carrier film may be placed on the mold surfaces 94a, 94b and 98a, 98b prior to lay-up of the crossply and unidirectional laminates 60i, 70i, 60m, 70o, which material or film facilitates release thereof from the innermost and intermediate molds 90, 95. The mold is opened and the end portions 62e of the crossplies 62 are folded around the portion of the mandrel assembly 110 which corresponds to the forward and aft conic regions 45, 47 of the composite spar 10, thereby joining the innermost crossply laminates 60i. To further improve adhesion in the conic sections 45, 47, a heat source may be applied to the end portions 62e when they are folded up and joined. The mandrel assembly 110, which includes the innermost crossply and unidirectional laminates 60i, 70i, is sequentially placed into one of the complementary mold halves of the remaining molds, i.e., intermediate or outermost, and the above procedure is repeated for mating the intermediate and outermost crossply laminates 60m, 60o, as required.

Figure 7E:
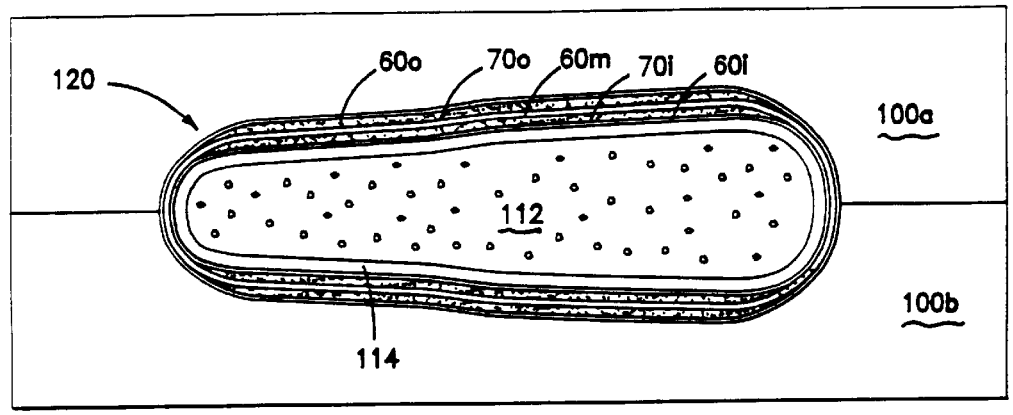

Referring to FIG. 7e, the assembly of laminates 60i, 70i, 60m, 70o, 60o, from the innermost to outermost molds 90–100 results in a preform assembly 120 wherein the unidirectional laminates 70 are interposed between the crossply laminates 60. The outermost mold 100 is closed over the preform assembly 120 and placed in an autoclave oven for curing.

Compaction pressure is applied to the crossply and unidirectional laminates 60, 70 by pressurizing the impervious bladder 114 of the inflatable mandrel assembly 110. Pressurization urges and compacts the laminates 60, 70 against the mold surfaces 104a, 104b of the outermost mold 100. The entire assembly is then cured in a high temperature process, such as in an autoclave, to cure the composite spar 10. During the high temperature cure, the rigid substructure 112 shrinks to approximately 10% of its original size, thereby facilitating removal from the interior of the composite spar 10.

While the previously described method necessarily involves certain manual operations, i.e., the folding of the crossply ends 62e about the conic regions 45, 47, other manufacturing approaches are envisioned which are more amenable to automation. One such fabrication approach is shown in FIGS. 7f through 7j wherein the inflatable mandrel assembly 110 is used as the primary lay-up tool and a spar forming apparatus 200 facilitates assembly of the composite laminates 60, 70 about the mandrel assembly 110. Before discussing the various steps for assembling the composite laminates 60, 70 about the mandrel assembly 110, a brief description of the spar forming apparatus 200 is provided.

Figure 7F:
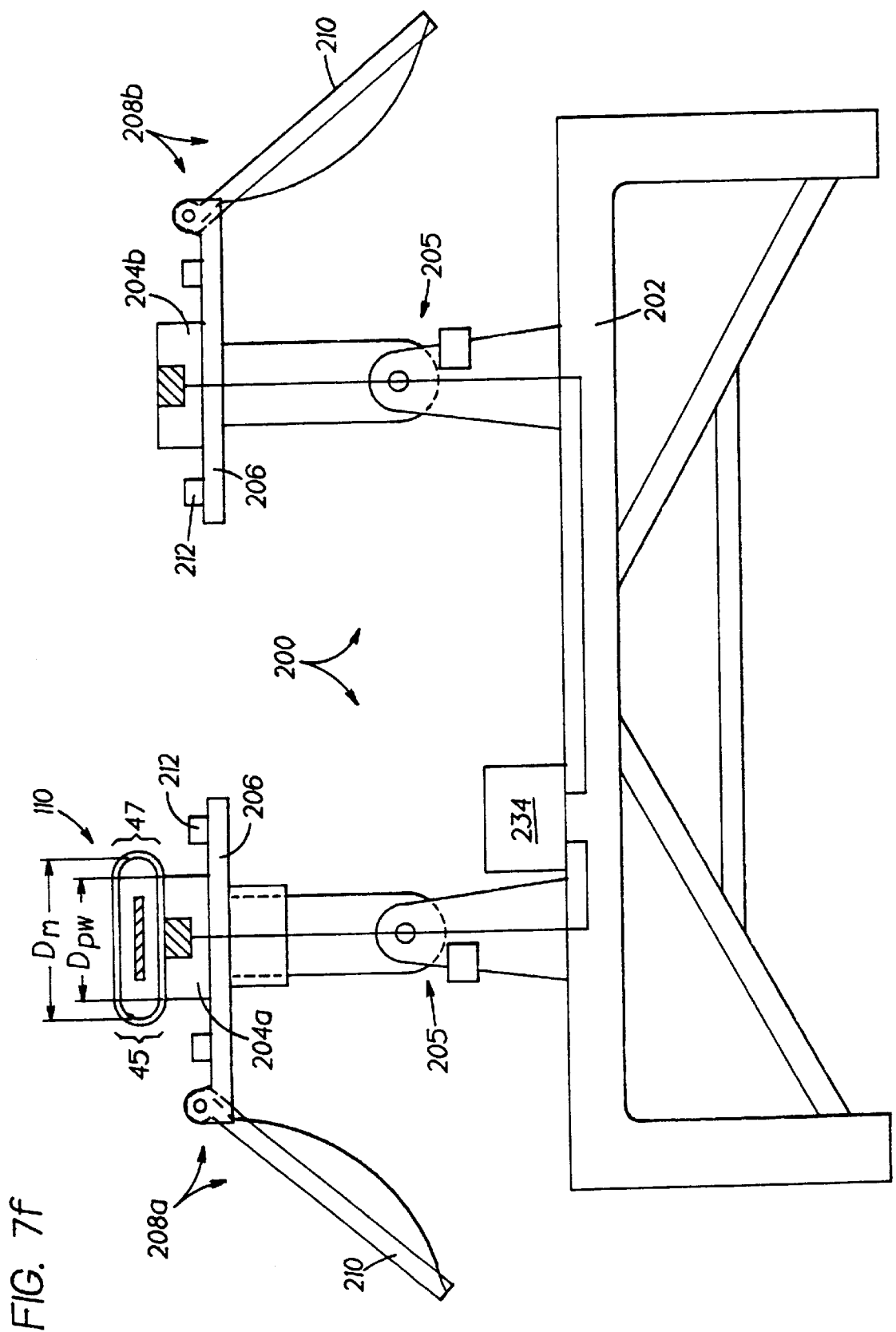

In FIG. 7f, the spar forming apparatus 200 comprises a base 202 for supporting first and second pedestal supports 204a, 204b, each of the pedestal supports 204a, 204b being mounted to the base 202 by means of a pivotable linkage arrangement 205. Furthermore, the spar forming apparatus 200 includes first and second forming/debulk assemblies 208a, 208b, each of the forming/debulk assemblies including a base plate 206 disposed beneath each of the pedestal supports 204a, 204b, a framed vacuum forming bladder 210 pivotally mounted to each base plate 206, and a raised sealing strip 212 disposed in combination with each base plate 206 and surrounding the respective pedestal support 204a or 204b. The framed vacuum forming bladder 210 and raised sealing strip 212 are functionally and structurally similar to those used in conventional debulk apparatus such as a "Brink Heat" table produced by Brisk Heat located in Columbus, Ohio.

As will be seen in subsequent views, the pedestal supports 204a, 204b are pivotable from a first orientation to a second orientation, to manipulate the orientation of the inflatable mandrel assembly 110 which, at various steps of the manufacturing process, rests atop one of the pedestal supports 204a, 204b. Such manipulation will permit access to both sides of the mandrel assembly 110 for lay-up of the composite laminates. For ease of the subsequent description, reference to the mandrel assembly 110 will refer to the mandrel assembly 110 and/or the mandrel assembly 110 in combination with some or all of the composite laminates at various stages of the lay-up process.

Each of the pedestal supports 204a, 204b are suitably configured to fully support the inflatable mandrel assembly 110 while providing unobstructed access to surfaces corresponding to the conic regions 45, 47 of the composite spar. More specifically, each pedestal support 204a, 204b preferably extends the entire length of the mandrel assembly 110 and has a width dimension Dpw which is less than the width Dm of the mandrel assembly 110. More preferably, the width dimension Dpw is less than or equal to the width of the sidewall regions of the composite spar. As will become apparent in the subsequent discussion, such geometry is necessary to permit the formation of the butt joints in the conic regions 45, 47.

In accordance with this fabrication technique, and referring to FIG. 7g, the inflatable mandrel assembly 110 is placed atop one of the pedestal supports 204a, 204b and laterally positioned by means of a positive locating device 220 (shown in phantom). As shown, the locating device 220 is disposed on one side of the pedestal support 204a and at various spanwise stations to provide a chordwise stop for the mandrel assembly 110. Furthermore, the locating device 220 is removable to permit subsequent lay-up and forming/debulk of the composite laminates 60, 70.

Once removed, the locating device 220 is functionally replaced by an electromagnetic coil system which produces a magnetic clamping force between the mandrel assembly 110 and the respective pedestal support 204a or 204b. Functionally, the electromagnetic coil system maintains the accurate orientation of the mandrel assembly 110 and holds/maintains the orientation of the mandrel assembly 110 as it is manipulated/transferred between the pedestal supports 204a, 204b. More specifically, the electromagnetic coil system comprises one or more electrically activated coils 232 disposed in combination with each of the pedestal supports 204a, 204b, and a controllable power source 234 to energize/de-energize the coils 232. The inflatable mandrel assembly 110 is modified to include a ferrous member 236 within the foam substructure 112 to serve as the one of the magnetic poles of the electromagnetic circuit. The requisite strength of the magnetic field to maintain the position of and manipulate the mandrel assembly 110 will vary depending upon the particular application. Generally, the requisite magnetic force will depend upon the spacing between the coils 232 and the ferrous member 236, and the weight of the mandrel assembly 110. Such electrically activated coils 232 are available from Everson Electric located in Bethlehem, Pa.

In the preferred embodiment, a plurality of coils 232 and ferrous members 236 are employed at various spanwise stations, i.e., spaced apart, along the length of the mandrel assembly 110 to minimize weight. Furthermore, when employing this fabrication method, it is preferable to fabricate the foam substructure 112 from a high density foam, e.g., a foam having a density greater than about 4 lbs/ft³ (64 kgs/m³), to prevent crushing or damage to the foam substructure 112 due to the imposed magnetic forces.

Figure 7H:
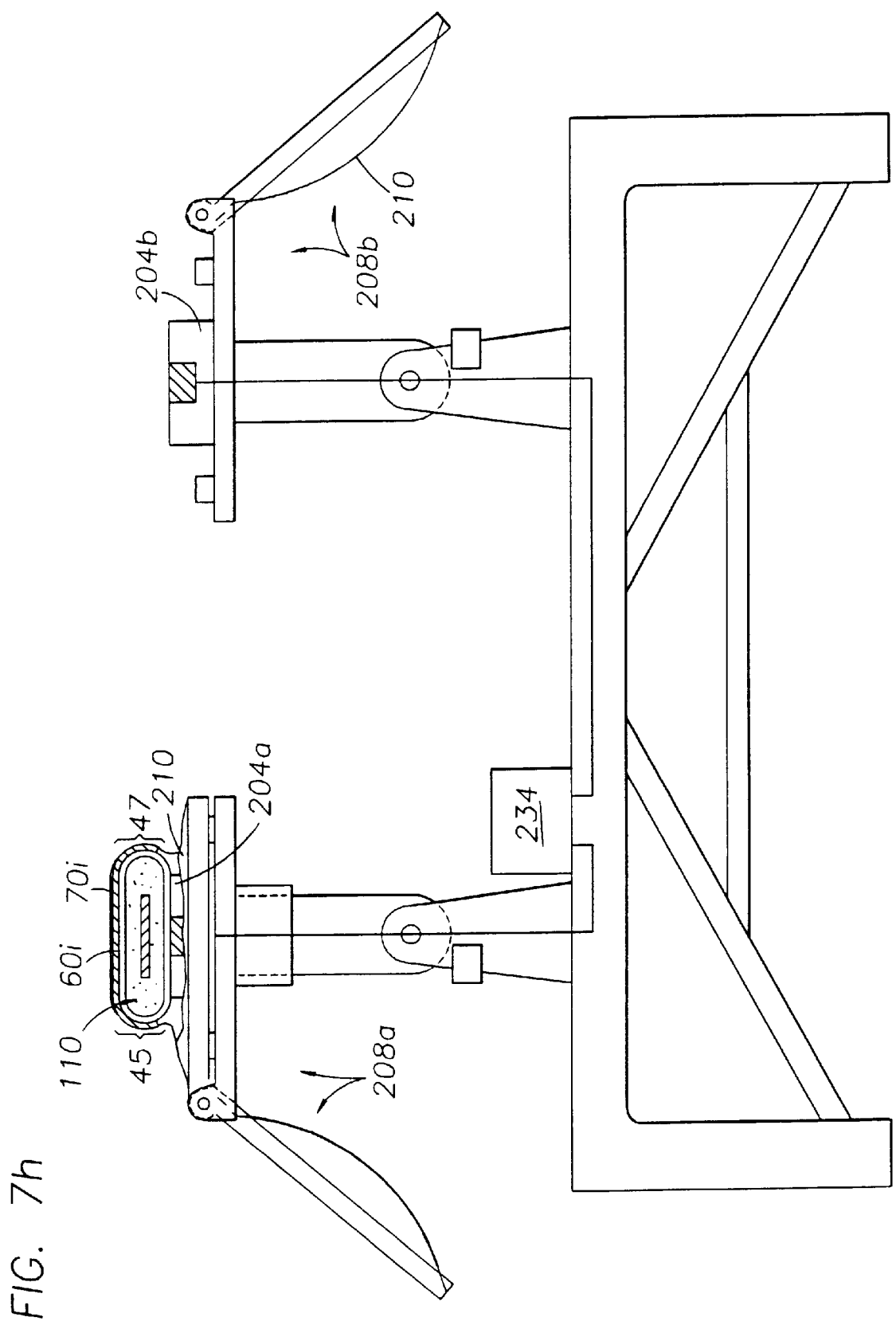

In FIG. 7h, the innermost crossply and unidirectional laminates 60i, 70i corresponding to the upper sidewall region of the composite spar are laid over the mandrel assembly 110 and forming/debulk operations are performed. Such forming/debulk operations may be performed following the lay-up of each ply of the laminates 60i, 70i or, alternatively, after a plurality of laminates 60i, 70i have been laid. The forming/debulk operation involves the steps of: causing the vacuum forming bladder 210 to envelope the laminates 60i, 70i such that the bladder 210 engages the sealer strip (occluded by the bladder 210 in FIG. 7h), and evacuating the cavity defined therebetween to compact the laminates 60i, 70i against the mandrel assembly 110. As mentioned earlier, the pedestal supports 204a, 204b are appropriately sized to permit the crossply laminates 60i, to wrap around the mandrel assembly and form the butt joints in the conic regions 45, 47. Furthermore, depending upon the vertical spacing between the pedestal support 204a, 204b and its respective sealer strip, it may be desirable to fabricate the vacuum forming bladder 210 from a high elongation material such that the vacuum forming bladder 210 readily conforms to the shape of the mandrel assembly 110. In the preferred embodiment, the vacuum forming bladder 210 is comprised of an elastomer material having a thickness of about 0.030 inches (0.076 cm) and a modulus of about 600 psi (4134 kPa).

Figure 7I:
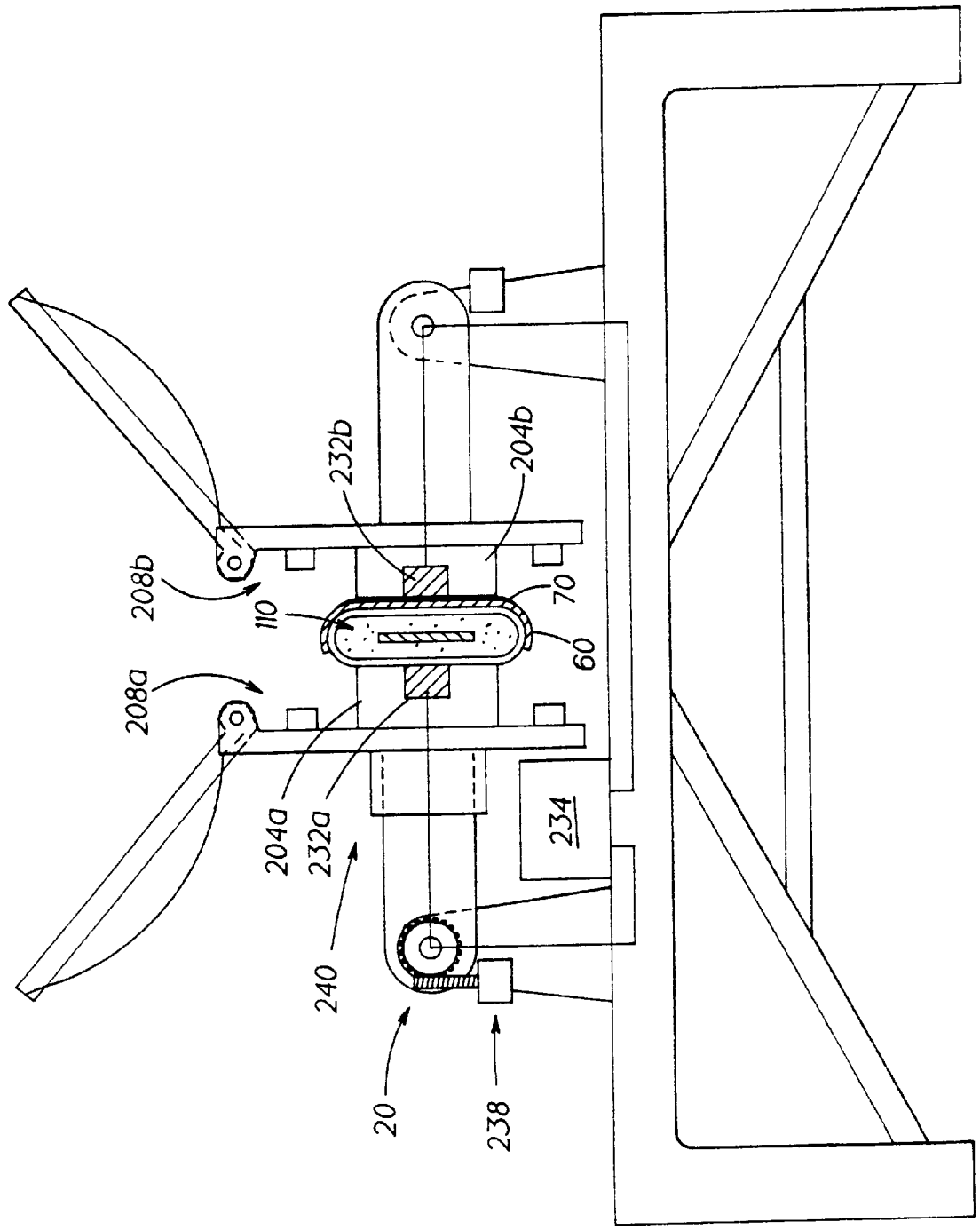

Having laid all of the crossply and unidirectional laminates 60i, 70i on one the side of the mandrel assembly 110, the pedestal supports 204a, 204b, are rotated from a horizontal position to a vertical position, as shown in FIGS. 7h and 7i, respectively. In the preferred embodiment, this is performed automatically by a conventional worm gear drive 238 (see FIG. 7i), though any drive means may be used to effect controlled synchronous rotation of the pedestal supports 204a, 204b. Once the pedestal supports 204a, 204b are opposed and are contiguous with the mandrel assembly 110, the electrically activated coil 232a associated with the first pedestal support 204a is de-energized while the electrically activated coil 232b associated with the second pedestal support 204b is energized. Accordingly, the mandrel assembly 110 is released from the first pedestal support 204a and held relative to the second pedestal support 204b. To accommodate the thickness variations resulting from the lay-up of composite laminates 60, 70 and/or clearance necessary to rotate the pedestal supports 204a, 204b into position, it may be desirable to incorporate a means for effecting linear translation of one or both of the pedestal supports 204a, 204b. For example, a telescoping device 240 associated with one or both of the support links 205 may be employed to adjust the position of the supports 204a, 204b to effect intimate contact thereof with the mandrel assembly 110. Alternatively, one or both of the linkage support arrangements 205 may be mounted in combination with linear bearings (not shown) to effect the requisite linear translation.

Figure 7J:
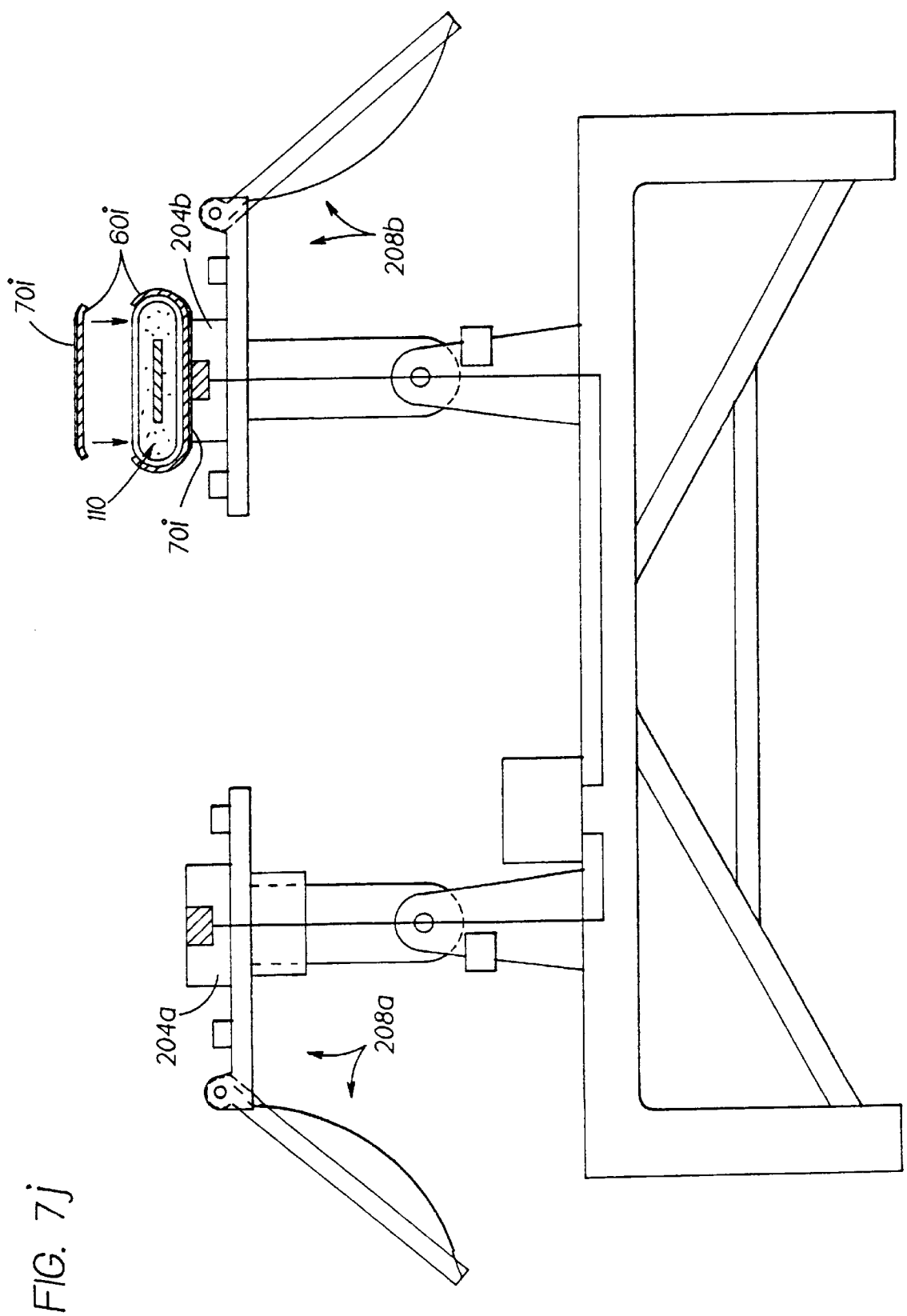

Upon transferring the mandrel assembly 110 from one pedestal support 204a to the other, the supports are again rotated to a horizontal position, as shown in FIG. 7j, to continue the lay-up process. While the pedestal supports 204a, 204b are shown to synchronously rotate, it will be appreciated that the fabrication process necessitates that only one of the supports 204a, 204b rotate to proceed.

The following steps involve iteratively laying up and forming/debulking the composite laminates 60, 70 and transferring the mandrel assembly 110 from one of the pedestal supports, 204a, 204b, to the other to facilitate lay-up over a side of the mandrel assembly 110. This process is continued until all of the composite laminates 60, 70 have been laid to produce the preform assembly 120 as previously described.

The preform assembly 120 is placed in a curing mold (not shown) which corresponds to and defines the outer mold line (OML) contour of the upper and lower sidewall and forward and aft conic regions 40, 42, 45, 47 of the composite spar. For the purposes of the subsequent discussion, such curing mold is structurally identical to the previously described outermost mold assembly 100 with the exception that the curing mold is not employed for lay-up of the outermost composite laminates 60o, 70o. Accordingly, it should appreciated that the outermost mold 100 and curing mold provide the same function and advantages with respect to curing the composite laminates 60, 70.

Having completed the description of the specific laminate construction, and the method steps for fabricating the composite spar 10, the following is a discussion of the structural and manufacturing advantages of the present invention.

Referring again to FIG. 2, the unidirectionally oriented fibers of the unidirectional laminates 70, located in the upper and lower sidewall regions 40, 42, are placed in a region of high flapwise bending stress for providing maximum flapwise bending strength. This placement of unidirectional fibers maximizes the distance from the flapwise bending neutral axis 54 for providing maximum flapwise bending strength and optimum structural efficiency. Unidirectional fibers are not employed in the conic regions 45,47 inasmuch as the close proximity to the flapwise bending axis 54, (a region of low flapwise bending stress), makes such fiber placement less effective. Conversely, the structural joints 68 are located in a region of low flapwise bending stress (i.e., in the forward and aft conic regions 45, 47) due to their close proximity to the flapwise bending axis 54. Such placement serves to prevent superimposition of stresses, i.e., flapwise bending stresses and stress concentrations induced by the structural joints 68. While such location appears to place the structural joints 68 in a region of high edgewise bending stress, due to the distance offset from the edgewise bending axis 55, the stiffness contributions of the leading edge sheath and trailing edge pocket assemblies 13, 16 serve to mitigate edgewise bending stresses in the conic regions 45, 47. To alleviate stress still further, the structural joints 68 are staggered and distributed in the conic regions 45, 47.

The axially biased ±40° fiber orientation (i.e., biased in the direction of the longitudinal axis 25) of the crossply laminates 60 augments axial strength and stiffness throughout the composite spar 10 while concomitantly, providing torsional stiffness. This orientation of fibers produces the optimum combination of torsional and axial stiffness relative to the flapwise and longitudinal axes 54, 25 for providing maximum weight efficiency. Furthermore, the axial bias reduces thermally induced stresses, and consequently, the effects of microcracking. To better understand this phenomena, reference is made for FIG. 8a which shows a finite element of composite material 130 having upper and lower layers 132u and 132l of ±50° crossplies relative to the Y-axis of a reference coordinate system, and an intermediate layer 134 of 0° unidirectional plies. For the purposes of this discussion, no distinction is made between the material selection of the layers. The figure also shows the development of a severe strain profile 136 upon exposure to large temperature excursions such as upon autoclave curing. This is caused by a large disparity which exists between the coefficients of thermal expansion $\alpha_x$ of the crossplies 132u, 132l and the unidirectional plies 134. The coefficient of thermal expansion $\alpha_x$ of the unidirectional material is dominated by the properties of the binding matrix, i.e., "resin dominated", such that the thermal expansion coefficient of such material is typically several orders of magnitude greater than that of the crossply material, i.e., "fiber dominated". Fiber dominated material is defined as a fiber matrix composite having fibers oriented above ±45° relative to the direction of thermal expansion. Hence, the ±50° fibers are fiber dominated inasmuch as fibers dominate or control the rate of thermal expansion along the X-axis. The severe strain distribution which develops can generate microcracks 138 in the laminate 130 and, consequently reduce overall laminate strength.

Figure 8A:
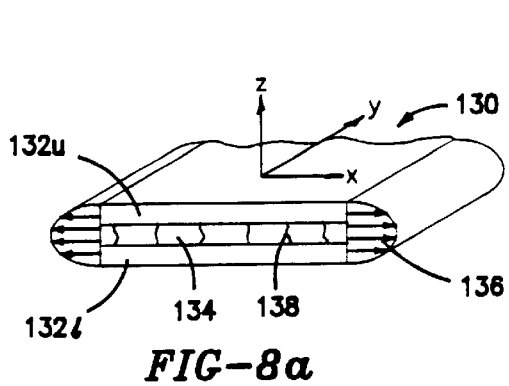
FIGS. 8a through 8e illustrate the thermal strain characteristics of a graphite and fiberglass fiber matrix composite and the effects on thermal strain when employing the teachings of the present invention.

To combat the effects of microcracking, the present invention employs crossply laminates 60 having a fiber orientation between about ±42° and ±38° relative to the longitudinal axis 25 of the composite spar 10 (analogous to the Y-axis in FIG. 8a). Such orientation results in a "resin dominated" matrix which more closely matches the thermal strain characteristics of the "resin dominated" unidirectional laminates 70. More specifically, the use of ±40° vs. ±45° crossply fiber orientation results in a 3 to 1 mismatch reduction between the thermal expansion of the crossply and unidirectional laminates 60, 70.

To further reduce microcracking, the composite spar 10 may employ reinforcing fabric 80 disposed between all layers 74 and preferably between all unidirectional plies 72. FIG. 8b shows an exploded view of a finite element of a composite article 140 employing the teachings of the present invention. The composite material includes ±40° crossply laminates 60, a multi-ply unidirectional laminate 70 having a ±0° fiber orientation, and plies of reinforcing fabric 80 disposed therebetween. As mentioned earlier, the reinforcing fabric 80 employs low modulus fibers oriented above about 80°, and preferably about 90° relative to the longitudinal axis 25. The reinforcing fabric 80 serves to strengthen the binding matrix in the transverse direction (along the X-axis) and reduce the severity of thermal incompatibility between the laminates. Hence, the combination of reinforcing fabric 80 and reduced crossply fiber orientation, i.e., ±40° vs. 45° or ±50° dramatically diminishes the severity of the thermal strain profile 146 (see FIG. 8c) for improved laminate strength.

In addition to preventing microcracking, the low modulus fibers of the reinforcing fabric 80 coupled with the low modulus layers 74L of the unidirectional laminates 70, provides superior damage tolerance. More specifically, during normal operation the low modulus fiberglass fibers (low modulus layers 74L) are loaded well below their strength capability while the high modulus graphite fibers are more highly loaded and react a dominant portion of the blade axial loads. Insofar as the low modulus fibers exhibit high elongation properties, i.e., the strain-to-failure ratio is approximately three times greater than that of the high modulus graphite fibers, the low modulus fibers are capable of absorbing high levels of impact energy before ultimate failure. Hence, in the event of an edgewise ballistic impact, the highly loaded graphite fibers will initially absorb the impact energy and, upon ultimate failure or damage thereto, the fiberglass fibers will ensue to absorb the remaining load without failure. Hence, the projectile energy will be absorbed and/or deflected so that ample fiber strength/ content remains, i.e., 50% or more, to continue safe flight operations.

Whereas the previous discussion addressed the thermal properties in the transverse direction (along the X-axis), the following discussion is directed to the thermal strain characteristics in the longitudinal direction. Greater emphasis is placed on material selection and placement thereof for creating a homogeneous, strain-balanced lay-up. Microcracking is not prevalent in the longitudinal (Y-axis) direction inasmuch as the binding matrix is supported by reinforcing fibers.

Figure 8D:
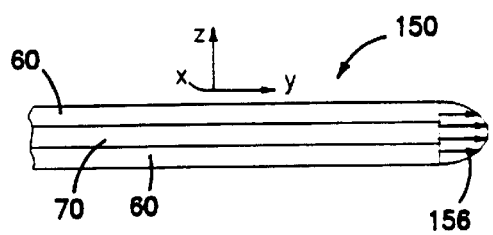
Figure 8E:
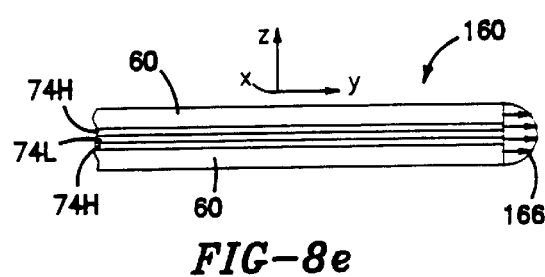
Figure 8B:
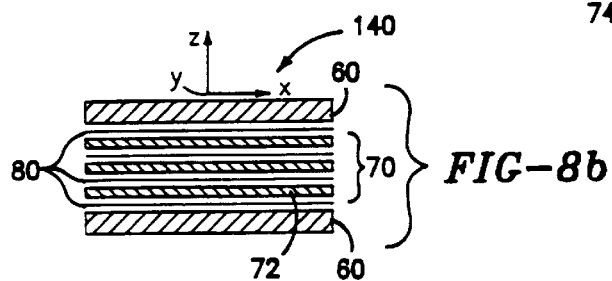
Figure 8C:
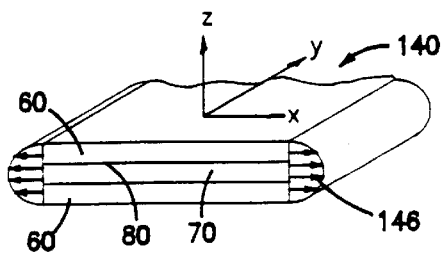

FIG. 8d shows an edge section (profile view) of a composite article 150 comprising ±40° upper and lower crossply laminates 60 and 0° unidirectional laminates 70 disposed therebetween. Upper and lower laminates 60 of crossply material are composed of high modulus graphite fibers and the unidirectional laminates are composed of a mix of high and low modulus graphite and fiberglass fibers. Inasmuch as the coefficient of thermal expansion $\alpha y$ of the graphite crossply laminates 60 is significantly less than that of the graphite/fiberglass unidirectional laminates 70, a strain profile 156, similar to that shown is produced. A peculiarity, however, exists with graphite material in that the thermal coefficient of expansion associated with 0° fibers is nearly the same as that of the ±40° fibers. Accordingly, to reduce the strain profile, it is preferable to selectively place the graphite fibers within the unidirectional laminate. Referring to FIG. 8e, an edge section of a modified composite article 160 is shown having an intermediate layer 74H of high modulus graphite fibers interposed between layers 74L of low modulus fiberglass. The high modulus graphite serves to inhibit the thermal strain of the low modulus fiberglass on both sides thereof to reduce or flatten the strain profile 166. Such distribution of material, therefore, thus generates a strain-balanced laminate.

Figure 9A:
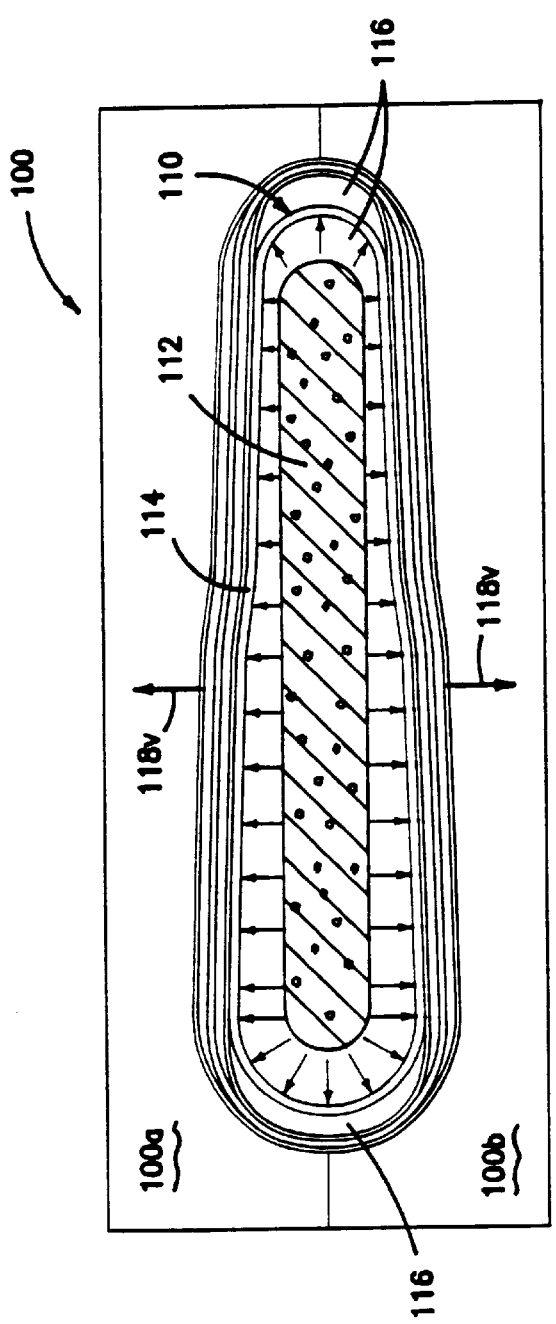
FIGS. 9a and 9b depict the use of an inflatable mandrel to form the composite spar of the present invention.
Figure 9B:
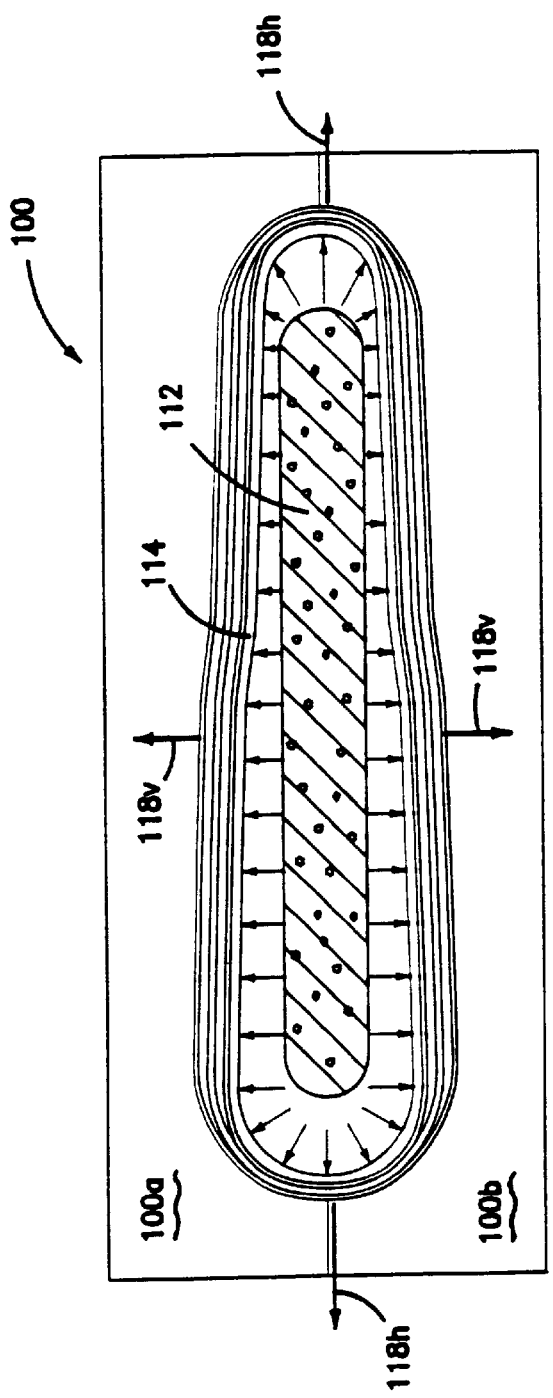

Referring now to the manufacturing advantages of the present invention, the placement and location of the structural joints 68 serves the dual purposes of providing structural efficiency and facilitating the fabrication process. The manufacturing benefits of such construction are best understood by referring to FIGS. 9a and 9b which show the inflatable internal mandrel assembly 110 in a partially inflated state within the outermost mold 100 (or the curing mold, depending upon the selected manufacturing method). The voids 116 between the impervious bladder 114 and the rigid substructure 112 and between the bladder and laminate are greatly exaggerated for illustration purposes. It will be apparent that an inflatable bladder will initially form a round or circular contour before taking on the elliptical shape of the composite spar 10. Accordingly, the bladder initially compacts the sidewall regions 40, 42 and of the spar 10 in the direction of the upper and lower vertical arrows 118v and, upon full pressurization thereof (see FIG. 9b), the bladder compacts the forward and aft conic regions 45, 47 in the direction of the fore and aft horizontal arrows 118h. Should structural joints, and associated slip planes, be located in areas other than in the conic regions, e.g., in the sidewall regions, the inflatable bladder will tend to trap or pinch the plies against the outermost mold surface and prevent slip plane movement. Accordingly, compaction of the laminates in the conic regions 45, 47 will be incomplete and deleteriously affect laminate quality.

The present invention places the joints 68 and associated slip planes 66 (between adjacent crossplies) in the conic regions 45, 47 for obviating the above mentioned difficulties and effecting complete compaction of the entire composite spar lay-up. It should also be noted that the mold surfaces for laying up the crossply and unidirectional laminates 60i, 70i, 60m, 70o, 60o, are essentially net dimension, i.e., as close as practicable to the final shape and location of the associated cured composite spar laminate(s). The relatively close tolerances held from lay-up to final cured dimensions require minimum displacement along the slip planes 66, thereby assuring complete and uniform laminate compaction.

The method of the present invention utilizes constant width crossply and unidirectional laminates 60, 70 which may be acquired pre-cut to size and laid without subsequent cutting or darting of material. The simplified lay-up procedure and tooling approach, i.e., using constant width, multiply laminates, avoids the complexities of the prior art associated with locating and cutting individual plies. This substantially reduces material waste and the hands-on labor required for assembly. Furthermore, the method of the present invention is amenable to automated lay-up. For example, each ply or laminate may be rolled and/or laid by automated machinery into a complementary mold half and subsequently de-bulked. Alternatively, each constant width laminate may be laid via conventional tape layup apparatus and subsequently placed via pick-and-place apparatus over the mandrel assembly. Tape lay-up apparatus such as those produced by Cincinnati Milicron are useful for automated lay-up of the type described. Furthermore, pick and place apparatus such as those described in Trudeau U.S. Pat. Nos. 5,209,804 and 5,290,386 may be used for the delivery/transport of plies/laminates to the mold surface.

Figure 10:
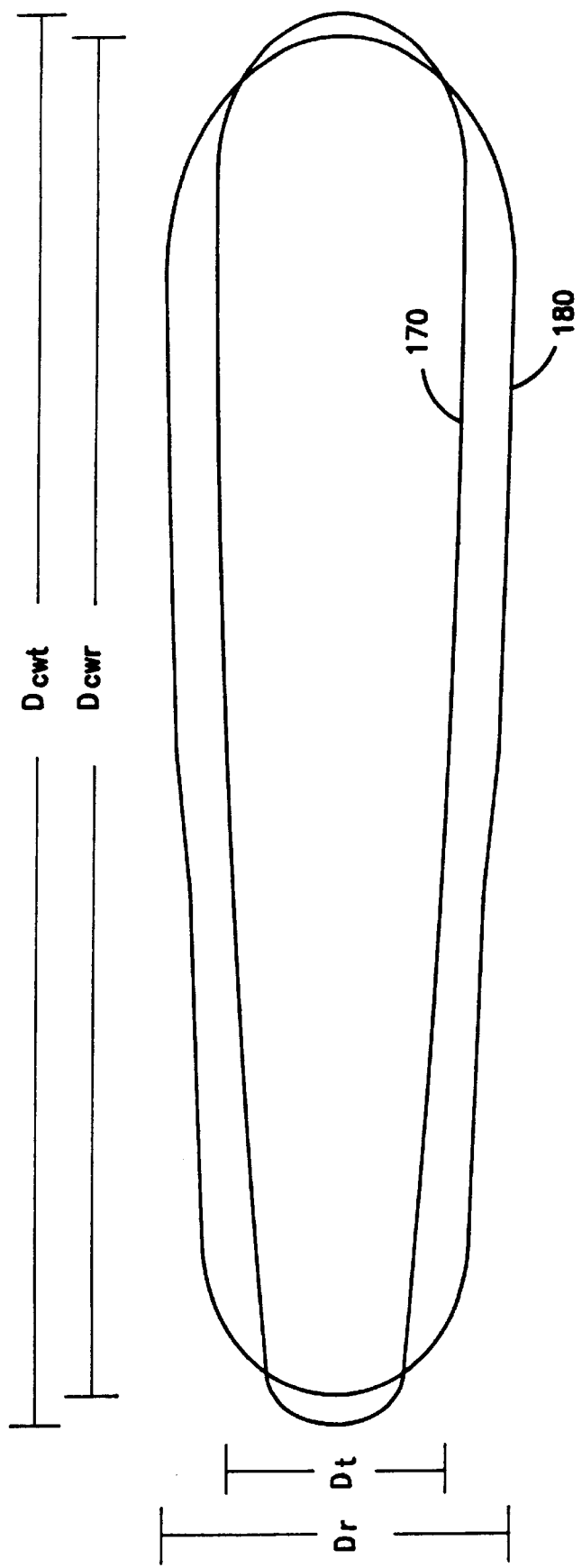
FIG. 10 shows the outer mold line contour of the composite spar at an inboard and outboard section thereof.

Referring to FIG. 10, OML contour profiles 170, 180 at the root and tip ends, respectively, of the composite spar 10 are overlaid for comparison purposes. The vertical thickness dimension, Dr and Dt, and chordwise width dimension Dcwr and Dcwt, are shown for the OML profiles 170 and 180, respectively. The thickness dimension, Dr and/or Dt, is generally established by the desired airfoil thickness contour of the rotor blade assembly 6.

Referring back to FIG. 1, it is typically desirable for a helicopter rotor blade to be greater in thickness at the root end 2 thereof than at the tip end 4 for generating greater lift in regions of low velocity airflow, i.e., due to the smaller radial distance from the rotational axis 28 as compared to a larger radial distance to the tip end portion 4. Accordingly, it is common practice to taper a composite spar 10 structure in thickness and/or width dimension in accordance with airfoil contour changes, e.g., reducing thickness outboard to accommodate a thinner airfoil section. Such tapering is typically effected by cutting and/or darting of composite ply laminates. This method of construction, however, is highly labor intensive and induces additional stress concentrations within the laminate due to fiber discontinuity.

Coupled with the requirement for a thinner airfoil section at the rotor blade tip end 4, is the requirement to maintain rotor inertia for preventing a sudden decay in rotor speed due to large pilot command inputs, e.g., a large thrust/collective command input in an autorotation maneuver. It is common practice to append inertial weights to the rotor blade tip end 6 to augment rotor inertia. While this has not been problematic for heavy titanium and aluminum rotor blades of the prior art, the light weight attributes of composite construction are, in part, negated by the desire for inertial mass at the rotor blade tip end 6.

The method of the present invention addresses these seemingly unrelated design issues by the application of constant chordwise width crossplies and unidirectional plies 62, 72. The chordwise width dimension Dcw of each ply is predetermined and constant along the longitudinal axis 25 of the spar. It will be appreciated by examining the root and tip end profiles 170, 180 in FIG. 10, that the peripheral dimension of each, measured along the outer mold line contour of the composite spar 10, is essentially constant, i.e., within 5% of the other. This arises from the use of constant width plies 62, 72 wherein the reduction in thickness Dt at the tip end of the composite spar 10, results in a consequential increase in chordwise width dimension, Dcwt. The present invention, therefore restores rotor inertia at the rotor blade tip end by advantageously exploiting the increased chordwise width dimension of the composite spar 10 and the weight associated therewith.

The composite spar 10 of the described invention is comprised of sixteen graphite fiber matrix crossplies 62, and thirty-two graphite and fiberglass fiber matrix unidirectional plies 72, however, any number of composite plies may be employed depending on the loading requirements for a particular application. Although the invention is described as using graphite and fiberglass composite fibers, other composite fibers may be used which provide similar strength and modulus characteristics as the construction described herein. Furthermore, the preferred embodiment includes plies of reinforcing fabric 80 interspersed between all unidirectional plies 72, however, it will be apparent that such reinforcing fabric 80 may be eliminated depending upon the desired degree of spar strength and damage tolerance.

While the preferred embodiment describes a composite spar 10 having innermost, outermost and intermediate crossply laminates, 60i, 60o, 60m, in the upper and lower sidewall regions 40, 42, and unidirectional laminates 70i, 70o, between the crossply laminates, it should be apparent that at few as two crossply laminates, e.g., 60*i*, and 60*o*, in each of the upper and lower sidewall regions 40, 42, respectively, and at least one unidirectional laminate, e.g., 70*i*, in each of the same regions, may be employed. It will be appreciated that more plies of composite material will be necessary in each of the laminates to bear the same applied loads. Furthermore, additional crossply and unidirectional laminates 60, 70 may be employed to further strengthen and balance the composite lay-up.

One embodiment of the invention describes a composite spar manufactured utilizing a plurality of molds, however it should be realized that as few as two, e.g. Innermost and outermost molds 90, 100, or more than three may be used while remaining within the spirit and scope of the invention. While, in yet another embodiment, the composite spar is fabricated utilizing a spar forming apparatus 200 which performs the forming/debulking and mandrel handling operations, it should be appreciated that other automated equipment or a combination of automated equipment may be used to perform such operations independently. For example, while the described embodiment shows forming/debulk assemblies 208*a*, 208*b* in combination with the pedestal supports 204*a*, 204*b*, it should be appreciated that these components need not be integrated. While in the same embodiment, the mandrel assembly is modified to include a ferrous core member 236, it should be appreciated that the mandrel assembly need only to exhibit ferrous properties to operate in conjunction with the electromagnetic coil system. Furthermore, while the spar forming apparatus includes pedestal supports 204*a*, 204*b* which pivot and/or translate linearly into position, it should be appreciated that the invention contemplates any mechanism which is capable of manipulating the orientation of the mandrel assembly.

In summary, the present invention reduces microcracking, provides enhanced damage tolerance, optimally locates and orients the fiber reinforced material for maximum weight efficiency, and provides a strain balanced lay-up. Additionally, the method facilitates ease of manufacture, permits uniform laminate compaction, reduces hands on labor required during assembly, is repeatable and amenable to automated manufacture. Lastly, the method of construction yields an improved composite spar having an advantageous mass distribution along the longitudinal length thereof.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A method for manufacturing a composite spar (10), said composite spar (10) having upper and lower sidewall regions (40, 42) connected by forward and aft conic regions (45, 47), the method comprising the steps of:

providing an inflatable mandrel assembly (110) having a width dimension (Dm) and having ferrous properties;

providing a spar forming apparatus including:

first and second pedestal supports (204*a*, 204*b*) each being suitably configured for supporting the inflatable mandrel assembly (110), and having a width dimension (Dpw) which is less than the width dimension (Dm) of the mandrel assembly (110), said pedestal supports (204*a*, 204*b*) being movable from a first orientation to a second orientation;

at least one electrically activated coil (232) disposed in combination with each of the pedestal supports (204*a*, 204*b*); and a controllable power (234) source for selectively energizing said electrically activated coils (232) to effect a magnetic clamping force between the mandrel assembly (110) and one of the pedestal supports (204*a*, 204*b*);

assembling crossply and unidirectional laminates (60, 70) over the mandrel assembly (110) to form a preform assembly (120) having the unidirectional laminates (70) interposed between the crossply laminates (60) and having structural joints (68) and slip planes (66) in areas corresponding to the forward and aft conic regions (45, 47) of the composite spar (10), said assembly step comprising the substeps of:

a. energizing said electrically activated coil (232) associated with the one of the pedestal supports (204*a*, 204*b*) while in a first orientation to maintain the position of the mandrel assembly (110);

b. laying said crossply and unidirectional laminates (60, 70) over a side of the mandrel assembly (110), c. forming said crossply and unidirectional laminates (60, 70) such that said crossply laminates (60) are caused to wrap around the mandrel assembly (110) in areas corresponding to the conic regions (45, 47) of the composite spar (10);

d. moving said pedestal supports (204*a*, 204*b*) into a second orientation such that each is contiguous with the mandrel assembly (110)

e. de-energizing the electrically activated coil (232) associated with one of the pedestal supports (204*a* or 204*b*) and energizing the electrically activated coil (232) associated with the other of the pedestal supports (204*a* or 204*b*) to effect transfer of the mandrel assembly (110) from one to the other of the pedestal supports (204*a*, 204*b* );

f. repeating steps a through e until all crossply and unidirectional laminates have been laid, thereby forming a preform assembly (120);

placing the preform assembly (120) into a curing mold having mold surfaces defining an outer contour of the composite spar (10);

pressurizing the inflatable mandrel assembly (110) for urging the crossply and unidirectional laminates (60, 70) against the mold surfaces of the curing mold to compact the laminates (60, 70); and, curing the crossply and unidirectional laminates (60, 70), whereby the forming of structural joints (68) and slip planes (66) in conics regions (45, 47) facilitates uniform compaction of the crossply and directional laminates (60, 70).

\* \* \* \* \*